United States Patent
Jiang et al.

(10) Patent No.: US 12,081,301 B2
(45) Date of Patent: Sep. 3, 2024

(54) CLOSED-LOOP INTELLIGENT CONTROLLED TRANSMISSION (CLICT) AND ENHANCEMENT WITH DISTRIBUTED SOURCE CODING

(71) Applicant: QUALCOMM Incorporated, San Diego, CA (US)

(72) Inventors: Jing Jiang, San Diego, CA (US); Seyedkianoush Hosseini, San Diego, CA (US); Vinayak Suresh, San Diego, CA (US); John Edward Smee, San Diego, CA (US); Yu Zhang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/846,981

(22) Filed: Jun. 22, 2022

(65) Prior Publication Data

US 2023/0421219 A1    Dec. 28, 2023

(51) Int. Cl.
*H04L 5/12* (2006.01)
*H04B 7/0417* (2017.01)
(Continued)

(52) U.S. Cl.
CPC ......... *H04B 7/0626* (2013.01); *H04B 7/0417* (2013.01); *H04B 7/043* (2013.01); *H04B 7/0617* (2013.01)

(58) Field of Classification Search
CPC .... H04B 7/063; H04B 7/0626; H04B 7/0639; H04W 72/1268; H04W 24/10; H04W 72/1289; H04L 1/0026
(Continued)

(56) References Cited

U.S. PATENT DOCUMENTS

2012/0082198 A1* 4/2012 Zhang ................ H04B 17/373
                                                    375/224
2020/0059282 A1* 2/2020 Wu .................... H04B 7/0413
(Continued)

FOREIGN PATENT DOCUMENTS

WO    WO-2021175634 A1    9/2021

OTHER PUBLICATIONS

International Search Report and Written Opinion—PCT/US2023/067119—ISA/EPO—Feb. 15, 2024 (2202219WO).
(Continued)

*Primary Examiner* — Khai Tran
(74) *Attorney, Agent, or Firm* — Holland & Hart LLP

(57) ABSTRACT

Methods, systems, and devices for wireless communications are described. A user equipment (UE) and a network entity may support communication of a compressed channel state information (CSI) feedback. The UE and the network entity may use closed-loop feedback to improve beamforming tracking accuracy. For example, the UE may receive a CSI reference signal (CSI-RS) that is beamformed based on a channel estimate of a sounding reference signal (SRS) or a previous CSI feedback, or both. The UE may transmit a feedback message including compressed CSI that is generated through encoding a measurement of the CSI-RS. The compressed CSI may be generated based on a predicted channel estimate at the network entity, determined based on the channel estimate of the SRS or the previous CSI feedback.

26 Claims, 16 Drawing Sheets

(51) Int. Cl.
    *H04B 7/0426*     (2017.01)
    *H04B 7/06*     (2006.01)

(58) Field of Classification Search
    USPC .......................................... 275/262, 260, 167
    See application file for complete search history.

(56) References Cited

U.S. PATENT DOCUMENTS

| | | | |
|---|---|---|---|
| 2022/0006496 A1* | 1/2022 | Park ...................... | H04W 72/23 |
| 2022/0069881 A1 | 3/2022 | Rahman et al. | |
| 2022/0286261 A1* | 9/2022 | Wu ....................... | H04L 5/0057 |
| 2022/0286882 A1* | 9/2022 | Laghate ................ | H04W 24/10 |
| 2022/0361202 A1* | 11/2022 | Yi .......................... | H04W 24/10 |
| 2023/0239029 A1* | 7/2023 | Rahman ............... | H04B 7/0639 |
| | | | 370/252 |
| 2023/0397027 A1* | 12/2023 | Venugopal ............ | H04W 24/08 |

OTHER PUBLICATIONS

VIVO: "Further Discussion and Evaluation on MTRP CSI and Partial Reciprocity", 3GPP TSG RAN WG1 #103-e, R1-2009509, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 4, 2020, XP052351420, 24 Pages, Section 3, p. 9 paragraphs 1-4, figure 4.
Partial International Search Report—PCT/US2023/067119—ISA/EPO—Dec. 5, 2023 (2202219WO).

\* cited by examiner

CLOSED-LOOP INTELLIGENT CONTROLLED TRANSMISSION (CLICT) AND ENHANCEMENT WITH DISTRIBUTED SOURCE CODING

FIELD OF TECHNOLOGY

The following relates to wireless communications, including closed-loop intelligent controlled transmission (CLICT) and enhancement with distributed source coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support performing closed-loop intelligent controlled transmission (CLICT) and enhancement with distributed source coding to improve beamforming quality while also reducing overhead signaling. Generally, the described techniques support the signaling of a feedback message to at least partially recover a channel state information (CSI) reference signal (CSI-RS) measurement estimated by a user equipment (UE). A UE may acquire CSI (e.g., characteristics of a channel) and estimate a channel based on taking channel measurements of a CSI-RS transmitted by a network entity. Additionally, or alternatively, the network entity may acquire CSI specific to the UE and estimate the channel based on taking channel measurements of a sounding reference signal (SRS) transmitted by the UE. In some examples, the network entity may use the channel measurement of the SRS to beamform a CSI-RS. For example, a UE may transmit an SRS to a network entity, the network entity may beamform, or precode, a CSI-RS based on a channel estimate of the SRS, and the UE may receive the beamformed CSI-RS.

Although the network entity may recover some information about the UE-measured CSI based on the network entity's measurement of the SRS, the preciseness and accuracy of the UE-measured CSI recovered by the network entity may be improved if channel measurements made by the UE are considered when recovering the UE-measured CSI. In some aspects, the UE may generate compressed CSI (e.g., an abbreviated CSI) based on encoding a measurement of the CSI-RS, and the UE may transmit a feedback message containing the compressed CSI. That is, the UE may take channel measurements of a CSI-RS received from the network entity to acquire CSI observed from the UE perspective, and the UE may share a portion of the UE-measured CSI with the network entity. In some other aspects, the UE may receive an indication of a predicted CSI-RS estimate for the UE, and the UE may transmit a feedback message indicating a difference between the predicted CSI-RS estimate and the CSI-RS estimate observed by the UE. By receiving the compressed CSI or the difference between the predicted CSI-RS estimate and the CSI-RS estimate observed by the UE, the network entity may recover a more accurate estimate of the CSI-RS observed by the UE, contributing to improved communication quality and power efficiency for wireless communications.

A method for wireless communication at a UE is described. The method may include receiving, from a network entity, a CSI-RS that is beamformed based on a channel estimate of an SRS transmitted from the UE, or a previous CSI feedback transmitted from the UE based on a previous CSI-RS, or both and transmitting a feedback message including compressed CSI that is generated based on encoding a measurement of the CSI-RS.

An apparatus for wireless communication at a UE is described. The apparatus may include a processor, memory coupled with the processor, and instructions stored in the memory. The instructions may be executable by the processor to cause the apparatus to receive, from a network entity, a CSI-RS that is beamformed based on a channel estimate of an SRS transmitted from the UE, or a previous CSI feedback transmitted from the UE based on a previous CSI-RS, or both and transmit a feedback message including compressed CSI that is generated based on encoding a measurement of the CSI-RS.

Another apparatus for wireless communication at a UE is described. The apparatus may include means for receiving, from a network entity, a CSI-RS that is beamformed based on a channel estimate of an SRS transmitted from the UE, or a previous CSI feedback transmitted from the UE based on a previous CSI-RS, or both and means for transmitting a feedback message including compressed CSI that is generated based on encoding a measurement of the CSI-RS.

A non-transitory computer-readable medium storing code for wireless communication at a UE is described. The code may include instructions executable by a processor to receive, from a network entity, a CSI-RS that is beamformed based on a channel estimate of an SRS transmitted from the UE, or a previous CSI feedback transmitted from the UE based on a previous CSI-RS, or both and transmit a feedback message including compressed CSI that is generated based on encoding a measurement of the CSI-RS.

In some examples of the method, apparatuses, and non-transitory computer-readable medium described herein, transmitting the feedback message may include operations, features, means, or instructions for transmitting the feedback message including the compressed CSI, where a granularity or amount of feedback in the compressed CSI may be based on a statistical dependency between a predicted CSI-RS estimate at the network entity and the measurement of the CSI-RS.

Some examples of the method, apparatuses, and non-transitory computer-readable medium described herein may further include operations, features, means, or instructions for receiving, form the network entity, an indication of the granularity, amount, or both, of the feedback in the compressed CSI, where a CSI compression rate may be based on a correlation of the CSI of the SRS, a quality of the CSI-RS, a capacity of a feedback channel containing the feedback message, or a combination thereof.

Some examples of the method, apparatuses, and non-transitory computer-readable medium described herein may further include operations, features, means, or instructions for receiving downlink data that may be beamformed based on CSI generated from the channel estimate of the SRS and the compressed CSI, where the downlink data may be assumed to be quasi-collocated with the feedback message.

Some examples of the method, apparatuses, and non-transitory computer-readable medium described herein may further include operations, features, means, or instructions for transmitting a message indicating a capability to encode a CSI-RS measurement.

In some examples of the method, apparatuses, and non-transitory computer-readable medium described herein, transmitting the feedback message may include operations, features, means, or instructions for transmitting the feedback message in a different frequency band than the CSI-RS may be received.

Some examples of the method, apparatuses, and non-transitory computer-readable medium described herein may further include operations, features, means, or instructions for receiving a grant scheduling downlink data, where a downlink control channel carrying the grant may be quasi-collocated with the previous CSI-RS, a predicted CSI-RS estimate, or both and monitoring for the downlink data that may be beamformed based on CSI generated from the channel estimate of the SRS and the compressed CSI.

In some examples of the method, apparatuses, and non-transitory computer-readable medium described herein, encoding the measurement of the CSI-RS may include operations, features, means, or instructions for applying an encoding scheme to the measurement of the CSI-RS to generate the compressed CSI based on an assumed predicted CSI-RS estimate at the network entity.

In some examples of the method, apparatuses, and non-transitory computer-readable medium described herein, the encoding scheme may be a syndrome-based encoding scheme.

Some examples of the method, apparatuses, and non-transitory computer-readable medium described herein may further include operations, features, means, or instructions for receiving control signaling indicating an encoding scheme for encoding the measurement of the CSI-RS with a corresponding compression granularity, a corresponding data rate, or both, for the feedback message.

In some examples of the method, apparatuses, and non-transitory computer-readable medium described herein, the compressed CSI and the channel estimate of the SRS each include different portions of information associated with an estimated channel observed at the UE.

A method for wireless communication at a network entity is described. The method may include transmitting, to a UE, a CSI-RS that is beamformed based on a channel estimate of an SRS received from the UE, or a previous CSI feedback received from the UE based on a previous CSI-RS, or both and receiving a feedback message including compressed CSI that is generated based on the UE encoding a measurement of the CSI-RS.

An apparatus for wireless communication at a network entity is described. The apparatus may include a processor, memory coupled with the processor, and instructions stored in the memory. The instructions may be executable by the processor to cause the apparatus to transmit, to a UE, a CSI-RS that is beamformed based on a channel estimate of an SRS received from the UE, or a previous CSI feedback received from the UE based on a previous CSI-RS, or both and receive a feedback message including compressed CSI that is generated based on the UE encoding a measurement of the CSI-RS.

Another apparatus for wireless communication at a network entity is described. The apparatus may include means for transmitting, to a UE, a CSI-RS that is beamformed based on a channel estimate of an SRS received from the UE, or a previous CSI feedback received from the UE based on a previous CSI-RS, or both and means for receiving a feedback message including compressed CSI that is generated based on the UE encoding a measurement of the CSI-RS.

A non-transitory computer-readable medium storing code for wireless communication at a network entity is described. The code may include instructions executable by a processor to transmit, to a UE, a CSI-RS that is beamformed based on a channel estimate of an SRS received from the UE, or a previous CSI feedback received from the UE based on a previous CSI-RS, or both and receive a feedback message including compressed CSI that is generated based on the UE encoding a measurement of the CSI-RS.

In some examples of the method, apparatuses, and non-transitory computer-readable medium described herein, receiving the feedback message may include operations, features, means, or instructions for receiving the feedback message including the compressed CSI, where a granularity or amount of feedback in the compressed CSI may be based on a statistical dependency between a predicted CSI-RS estimate at the network entity and the measurement of the CSI-RS.

Some examples of the method, apparatuses, and non-transitory computer-readable medium described herein may further include operations, features, means, or instructions for transmitting downlink data that may be beamformed based on CSI generated from the channel estimate of the SRS and the compressed CSI.

Some examples of the method, apparatuses, and non-transitory computer-readable medium described herein may further include operations, features, means, or instructions for transmitting a grant scheduling downlink data, including the downlink data that may be beamformed based on CSI generated from the channel estimate of the SRS and the compressed CSI.

Some examples of the method, apparatuses, and non-transitory computer-readable medium described herein may further include operations, features, means, or instructions for receiving a message indicating a capability to encode a CSI-RS measurement and determining a feedback mode of operation for the UE based on the message.

In some examples of the method, apparatuses, and non-transitory computer-readable medium described herein, receiving the feedback message may include operations, features, means, or instructions for receiving the feedback message in a different frequency band than the CSI-RS may be transmitted.

In some examples of the method, apparatuses, and non-transitory computer-readable medium described herein, receiving the feedback message including compressed CSI may include operations, features, means, or instructions for decoding the compressed CSI based on a decoding scheme to decode the measurement of the CSI-RS.

A method for wireless communication at a UE is described. The method may include transmitting an SRS to a network entity, receiving, from the network entity, a CSI-RS that is beamformed based on a channel estimate generated from the SRS, receiving, from the network entity, an indication of a predicted CSI-RS estimate for the UE, and transmitting a feedback message that indicates a difference between the predicted CSI-RS estimate and a CSI-RS estimate observed by the UE.

An apparatus for wireless communication at a UE is described. The apparatus may include a processor, memory coupled with the processor, and instructions stored in the memory. The instructions may be executable by the processor to cause the apparatus to transmit an SRS to a network entity, receive, from the network entity, a CSI-RS that is beamformed based on a channel estimate generated from the SRS, receive, from the network entity, an indication of a predicted CSI-RS estimate for the UE, and transmit a feedback message that indicates a difference between the predicted CSI-RS estimate and a CSI-RS estimate observed by the UE.

Another apparatus for wireless communication at a UE is described. The apparatus may include means for transmitting an SRS to a network entity, means for receiving, from the network entity, a CSI-RS that is beamformed based on a channel estimate generated from the SRS, means for receiving, from the network entity, an indication of a predicted CSI-RS estimate for the UE, and means for transmitting a feedback message that indicates a difference between the predicted CSI-RS estimate and a CSI-RS estimate observed by the UE.

A non-transitory computer-readable medium storing code for wireless communication at a UE is described. The code may include instructions executable by a processor to transmit an SRS to a network entity, receive, from the network entity, a CSI-RS that is beamformed based on a channel estimate generated from the SRS, receive, from the network entity, an indication of a predicted CSI-RS estimate for the UE, and transmit a feedback message that indicates a difference between the predicted CSI-RS estimate and a CSI-RS estimate observed by the UE.

In some examples of the method, apparatuses, and non-transitory computer-readable medium described herein, receiving the indication of the predicted CSI-RS estimate may include operations, features, means, or instructions for receiving the indication of the predicted CSI-RS estimate via a radio resource control (RRC), a downlink control information, or both.

In some examples of the method, apparatuses, and non-transitory computer-readable medium described herein, receiving the indication of the predicted CSI-RS estimate may include operations, features, means, or instructions for receiving the indication of the predicted CSI-RS estimate, a portion of the CSI-RS estimate, or both, via a wideband, one or more sub-bands, or both.

In some examples of the method, apparatuses, and non-transitory computer-readable medium described herein, the difference between the predicted CSI-RS estimate and the CSI-RS estimate observed by the UE may be indicated in accordance with a non-uniform codebook centered around the predicted CSI-RS estimate, the non-uniform codebook associated with a codebook granularity, a feedback data rate, or both.

In some examples of the method, apparatuses, and non-transitory computer-readable medium described herein, the codebook granularity, the feedback data rate, or both may be based on a statistical dependency of the CSI-RS estimate, the channel estimate generated from the SRS, a previous CSI feedback transmitted from the UE based on a previous CSI-RS, or a combination thereof.

Some examples of the method, apparatuses, and non-transitory computer-readable medium described herein may further include operations, features, means, or instructions for receiving downlink data that may be beamformed based on CSI generated from the channel estimate of the SRS, a previous CSI feedback transmitted from the UE based on a previous CSI-RS, or both, and the difference between the predicted CSI-RS estimate and the CSI-RS estimate observed by the UE, where the downlink data may be quasi-collocated with the previous CSI-RS, the predicted CSI-RS estimate, or both.

In some examples of the method, apparatuses, and non-transitory computer-readable medium described herein, transmitting the feedback message may include operations, features, means, or instructions for transmitting the feedback message in a different frequency band than the CSI-RS may be received.

Some examples of the method, apparatuses, and non-transitory computer-readable medium described herein may further include operations, features, means, or instructions for receiving a grant scheduling downlink data and monitoring for the downlink data that may be beamformed based on CSI generated from the channel estimate of the SRS and the difference between the predicted CSI-RS estimate and the CSI-RS estimate observed by the UE.

In some examples of the method, apparatuses, and non-transitory computer-readable medium described herein, the indication of the predicted CSI-RS estimate may be based on the channel estimate of the SRS, a previous CSI feedback transmitted from the UE based on a previous CSI-RS, or both.

A method is described. The method may include receiving an SRS from a UE, transmitting a CSI-RS that is beamformed based on a channel estimate generated from the SRS, transmitting an indication of a predicted CSI-RS estimate for the UE, and receiving a feedback message that indicates a difference between the predicted CSI-RS estimate and a CSI-RS estimate observed by the UE.

An apparatus is described. The apparatus may include a processor, memory coupled with the processor, and instructions stored in the memory. The instructions may be executable by the processor to cause the apparatus to receive an SRS from a UE, transmit a CSI-RS that is beamformed based on a channel estimate generated from the SRS, transmit an indication of a predicted CSI-RS estimate for the UE, and receive a feedback message that indicates a difference between the predicted CSI-RS estimate and a CSI-RS estimate observed by the UE.

Another apparatus is described. The apparatus may include means for receiving an SRS from a UE, means for transmitting a CSI-RS that is beamformed based on a channel estimate generated from the SRS, means for transmitting an indication of a predicted CSI-RS estimate for the UE, and means for receiving a feedback message that indicates a difference between the predicted CSI-RS estimate and a CSI-RS estimate observed by the UE.

A non-transitory computer-readable medium storing code is described. The code may include instructions executable by a processor to receive an SRS from a UE, transmit a CSI-RS that is beamformed based on a channel estimate generated from the SRS, transmit an indication of a predicted CSI-RS estimate for the UE, and receive a feedback message that indicates a difference between the predicted CSI-RS estimate and a CSI-RS estimate observed by the UE.

Some examples of the method, apparatuses, and non-transitory computer-readable medium described herein may further include operations, features, means, or instructions for transmitting downlink data that may be beamformed based on CSI generated from the channel estimate of the SRS, a previous CSI feedback transmitted from the UE based on a previous CSI-RS, or both, and the difference between the predicted CSI-RS estimate and the CSI-RS estimate observed by the UE, where the downlink data may be quasi-collocated with the previous CSI-RS, the predicted CSI-RS estimate, or both.

In some examples of the method, apparatuses, and non-transitory computer-readable medium described herein, receiving the feedback message may include operations, features, means, or instructions for receiving the feedback message in a different frequency band than the CSI-RS may be transmitted.

DETAILED DESCRIPTION

Figure 1:
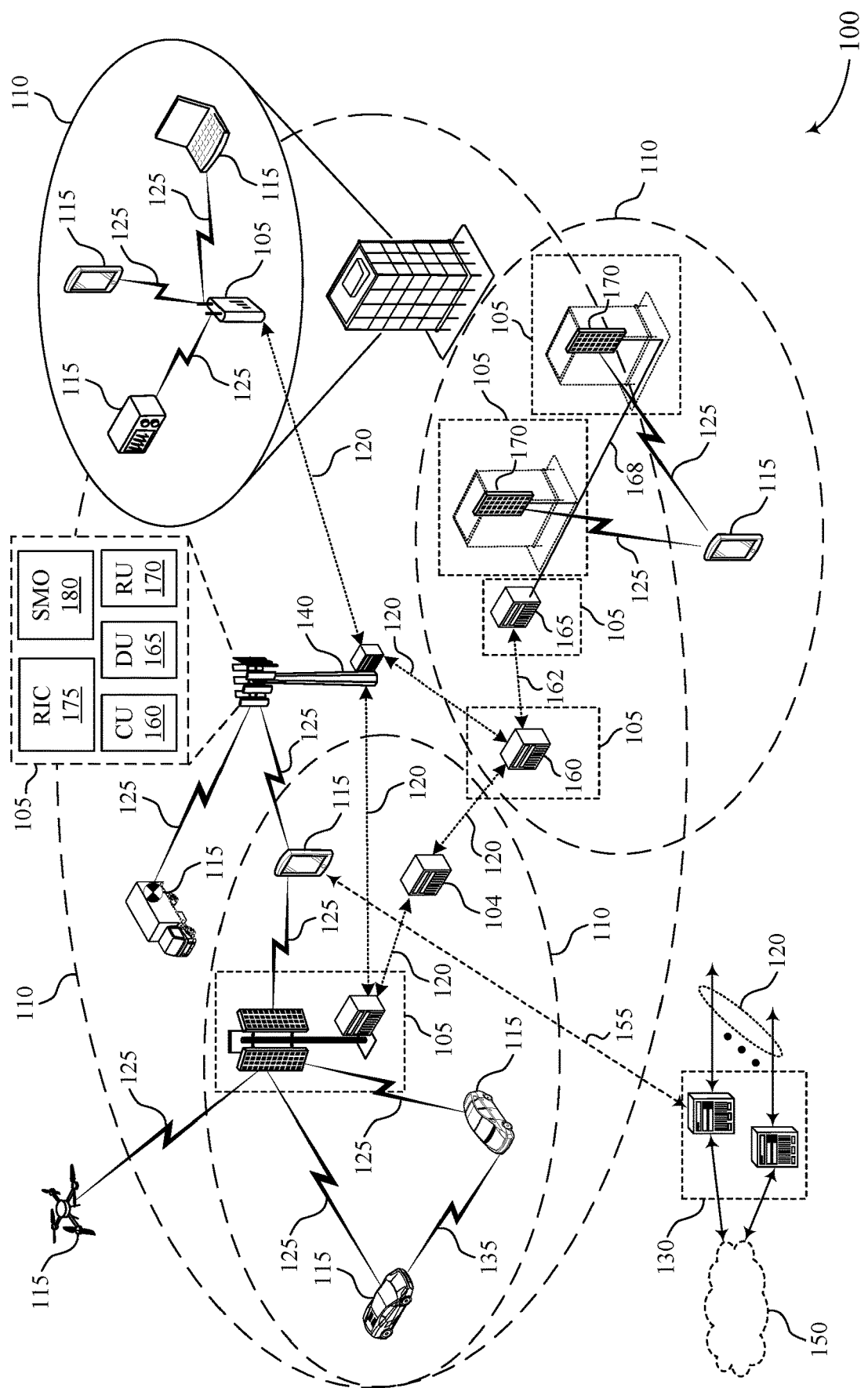
FIG. 1 illustrates an example of a wireless communications system that supports closed-loop intelligent controlled transmission (CLICT) and enhancement with distributed source coding in accordance with one or more aspects of the present disclosure.

In some wireless communications systems, a user equipment (UE) and a network entity have resource imbalances. For example, the network entity may have a larger number of antennas than the UE. Additionally, or alternatively, the network entity may have a larger transmission power than the UE. If network entity has a greater number of antennas than the UE, the network entity may have the capacity to perform channel measurements with greater accuracy and precision. Thus, channel measurement may be preferred at the network entity. However, because the network entity may also have a greater transmission power, the network entity may have the capacity to transmit reference signals and channel estimates with greater accuracy and precision. Thus, channel measurements may be preferred at the UE instead of at the network entity.

In some examples, the network entity may beamform a signal to focus transmission of the signal to the UE. In some cases, the quality of beamforming performed by the network entity may be based on the accuracy and precision of channel estimation measurements. For instance, the UE may measure a reference signal transmitted by the UE, and the UE may feedback channel state information (CSI) based on measuring the reference signal. In some other examples, the network entity may estimate the channel of a sounding reference signal (SRS) transmitted by the UE. The network entity may apply a precoding to a signal indicating the channel estimate and transmit the precoded signal indicating the channel estimate to the UE. In some cases, the sounding channel quality of an uplink channel may be limited by the uplink signal-to-noise ratio (SNR) of the uplink channel, and the uplink SNR may be constrained by limitations at the UE. Accordingly, the limited sounding channel quality of the uplink channel used to perform channel estimation measurements may cause inaccurate channel measurements, reducing the beamforming quality. Additionally, uplink feedback precision may be limited by the uplink capacity of the uplink channel, which may also be limited by the uplink SNR. Accordingly, the limited uplink feedback precision may also cause inaccurate channel measurements and reduce the beamforming quality.

Techniques, systems, and devices are described herein to support a CLICT and enhancement with distributed source coding in a wireless communications system. In some examples, a UE and a network entity may jointly measure the channel, and the UE may provide feedback to the network entity to improve beamforming quality and performance. Additionally, the UE and the network entity may each have a finite amount of power used for performing operations, such as operations for channel estimation. By sharing the load of performing operations for channel estimation, power consumption may be reduced at either device. The UE may transmit an SRS to the network entity, and the network entity may generate a channel estimate of the SRS. Additionally, the UE may receive a CSI-RS beamformed by the network entity based on the channel estimate of the SRS, and the UE may measure the CSI-RS beamformed by the network entity.

In some aspects, the UE may indicate compressed CSI to the network entity instead of transmitting the entirety of acquired CSI measured from the beamformed CSI-RS. For example, the UE may generate the compressed CSI based on encoding a measurement of the CSI-RS, and the UE may transmit a feedback message containing the compressed CSI. The compressed CSI may indicate, to the network entity, a portion or an approximation of high precision CSI as measured by the UE. Because the network entity may have already determined some information about the channel based on network entity's initial estimate of the SRS, the compressed CSI may include information which may assist the network entity to recover the high precision CSI measured by the UE. In other aspects, the network entity may signal a prediction of the channel estimate for the UE, and the UE may signal a correction to the channel such that the network entity may acquire a more accurate channel estimate for the UE. For example, the UE may receive an indication of a predicted CSI-RS estimate for the UE, and the UE may transmit a feedback message that contains a difference between the predicated CSI-RS estimate and a CSI-RS estimate observed by the UE.

Aspects of the disclosure are initially described in the context of wireless communications systems. Aspects of the disclosure are further illustrated by and described with reference to a signaling diagram and process flows. Aspects of the disclosure are further illustrated by and described with reference to apparatus diagrams, system diagrams, and flowcharts that relate to CLICT and enhancement with distributed source coding.

FIG. 1 illustrates an example of a wireless communications system 100 that supports CLICT and enhancement with distributed source coding in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CLICT and enhancement with distributed source coding as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communication system 100, the network entity 105 may have greater power capabilities and greater capacity for receiving uplink transmissions and for transmitting downlink transmissions. The network entity 105 may have a greater number of antennas than the UE 115. For instance, the network entity 105 may have 256 antennas, and the UE may have 4 antennas. Additionally, or alternatively, the network entity 105 may have a larger transmission power than the UE 115. For instance, the network entity 105 may send transmissions using 50 dBm of power, and the UE 115 may send transmissions using 23 dBm of power.

In the wireless communication system 100, the network entity 105, the UE 115, or both, may take channel measurements of a reference signal. In some examples, the UE 115, the network entity 105-a, or both, may discern CSI based on channel reciprocity, as measuring a downlink channel can provide some characteristics for an uplink channel and vice versa. For instance, in some examples, the network entity 105 may take channel measurements based on receiving an SRS from the UE 115. In other examples, the UE 115 may take channel measurements based on receiving a CSI-RS. Because the network entity 105 may have more antennas than the UE 115, the network entity 105 may have the capacity to perform channel measurements with greater accuracy and precision. Thus, channel measurement may be favored at the network entity. However, because the network entity 105 may also have greater transmission power, the network entity 105 may have the capacity to transmit reference signals if high power to facilitate CSI estimation with greater accuracy and precision. Accordingly, channel measurements may be favored at the UE 115 instead of at the network entity 105.

In some examples, the UE 115 may measure a CSI-RS transmitted by the network entity 105, and the UE 115 may respond by sending CSI feedback uplink based on measuring the CSI-RS. In such examples, the UE 115 may measure downlink CSI using channel measurements respective to the received CSI-RS. In some examples, the UE 115 may send the CSI feedback on a lower frequency band to improve link budget (e.g., power cost for communications on a communication link 125) to improve CSI precision. In other examples, the network entity may estimate the channel of an SRS transmitted by the UE 115, the network entity 105 may apply precoding to the channel estimate, and the network entity 105 may transmit the precoded channel estimate to the UE 115.

In some cases, the sounding channel quality of an uplink channel may be limited by the uplink SNR of the uplink channel, and the uplink SNR may be constrained by limitations at the UE (e.g., number of antennas, amount of transmission power). Additionally, uplink feedback precision may be limited by the uplink capacity of the uplink channel, which is also limited by the uplink SNR. For example, the network entity may use a precoder (e.g., a precoding matrix) to precode a signal to be transmitted to the UE. The UE 115 may transmit the precoder to the network entity so that the network entity may know which precoder to use when precoding the signal. In some cases, the UE 115 may transmit CSI feedback after taking channel measurements in addition to transmitting the precoder. In cases in which the UE 115 transmits the CSI feedback and the precoder to the network entity 105 on the same uplink channel, the uplink SNR and the uplink capacity of the uplink channel may be affected. Because the uplink SNR may limit the sounding channel quality for the uplink channel, the quality of signaling on the uplink channel may be limited. Additionally, because the uplink SNR may limit the uplink capacity for the uplink channel, the uplink feedback precision may also be limited.

As described herein, the UE 115 may perform a CLICT transmission by using closed-loop feedback to substantially improve beamforming tracking accuracy, hence improving user experience. For example, the CLICT transmission may enable laser-sharp beamforming by beamforming sub-space tracking to null interference across different reception antennas on a single user. In some examples, the wireless communication system 100 may be a multi-user (MU) MIMO system. The network entity 105 may communicate with several UEs 115 simultaneously in the MU-MIMO system, improving throughput. In the MU-MIMO system, the UE 115 may support a high rank and behave similarly to multiple independent MU-MIMO beamformed UEs, where each of the multiple independent MU-MIMO beamformed layers are processed based on a subset of antennas. For example, a UE 115 with 8 layer MIMO may have 8 receiver antennas, and a network entity 105 may beamform the UE 115 each antenna assuming that 8 antennas are independently demodulated with 1 antenna each and no joint processing. As an example, the network entity 105 may attempt to orthogonalize 8 layers of the UE 115 in the beamforming. Accordingly, the UE 115 may use a spatial sub-space MU-CSI feedback mechanism when performing a CLICT to substantially enhance MU-MIMO performance (or SU-MIMO performance without joint processing for receiver antennas) and further increase throughput at the UE 115. In some examples, the wireless communication system 100 may be a massive MIMO (mMIMO) system. The network entity 105 may have a larger number of antennas in the mMIMO system than in a typical MIMO system. In the mMIMO system, the performance loss of performing beamforming per antenna may be limited. Additionally, beamforming per antenna and processing per antenna single layer demodulation occurrence may substantially reduce complexity of the UE 115 (e.g., for cases in which multiple antenna pair groups are each beamformed assuming independent processing across the multiple antenna pair groups).

In some examples, MIMO orders (e.g., quantity of receive and/or transmit antennas used for signaling) may change the scaling of a modem envelope. The modem throughput for a MIMO envelop may linearly scale with respect to the bandwidth for a MIMO envelope. However, the modem throughput for a MIMO envelope may sublinearly scale with respect to a number of MIMO layers. A UE 115 with 2 layer MIMO may support much higher throughput than for 4 layer MIMO. The throughput gap between quantities of MIMO layers may increase as the scaling for the MIMO order increases. In some example, the UE 115 may have more favorable throughput scaling with MIMO order by getting closer to that of bandwidth scaling of a network entity 105.

In some examples, the UE 115 may have more favorable throughput scaling with MIMO order by performing certain beamforming techniques. If the network entity 105 may beamform in such a way that every 2 reception pairs of antennas are assumed to perform joint demodulation processing, and an orthogonalized channel from the other 2 reception pairs, the network entity 105 may have sufficient channel degrees-of-freedom. Additionally, massive MIMO distribution may substantially orthogonalize a channel amongst multiple devices (e.g., receiver antenna pair groups within a single UE 115) in the wireless communication system 100. When performing the CLICT transmission, the UE 115 may enable linear complexity scaling with respect to throughput as MIMO order scales. In some examples, the UE 115 may enable linear complexity scaling with respect to throughput for low to moderate mobility users. Additionally or alternatively, the UE 115 may enable linear complexity scaling with respect to throughput for moderate to high mobility users with ultra-fast sub-space (e.g., beamformed CSI-RS or DMRS) CSI feedback. The UE 115 may use the closed loop intelligent control mechanism designed for wireless control applications (e.g., 5G URLLC, Industrial-IOT) for fast CSI tracking purpose. In some examples, UE 115 may transmit more frequency feedback uplink to the network entity 105 based on a URLLC application.

The UE 115 may perform a CLICT transmission by performing channel measurements of reference signals alongside with the network entity 105 and by using closed-loop feedback to share channel measurements from the perspective of the UE 115. For example, the UE 115 may transmit an SRS to a network entity 105. From the network entity 105, the UE 115 may receive a CSI-RS that is beamformed based on a channel estimate of the SRS. In some aspects, the UE 115 and the network entity 105 may jointly measure the channel or subspace of the channel beamformed. In such aspects, the UE 115, the network entity 105, or both, may perform channel measurements to improve beamforming quality and improve power consumption. For example, the UE 115 may transmit a feedback message containing compressed CSI that is generated based on encoding a measurement of the CSI-RS. That is, the UE 115 may use an encoding scheme to generate an abbreviated version of the CSI measured and observed from the perspective of the UE 115 such that the UE-measured CSI contains a portion of the UE-measured CSI. By indicating the compressed CSI in a feedback message, the UE 115 may share a portion of the UE 115's CSI measurements with the network entity 105. Although the network entity 105 may discern the UE-measured CSI based on the network entity 105's channel estimate of the SRS, the network entity 105 may acquire a more accurate version of the UE-measured CSI by fusing the compressed CSI with information from the channel estimate of the SRS. Additionally, or alternatively, the UE 115 may receive an indication of a predicated CSI-RS estimate for the UE 115 and transmit a feedback message indicating a difference between the predicated CSI-RS estimate and the CSI-RS estimate observed by the UE 115. Based on the indicated difference, or error, between the predicted CSI-RS estimate and the CSI-RS estimate observed by the UE 115, the UE 115 may apply correction to the predicted CSI-RS estimate, allowing the UE 115 to estimate a more accurate CSI measurement or prediction with small overhead.

Figure 2:
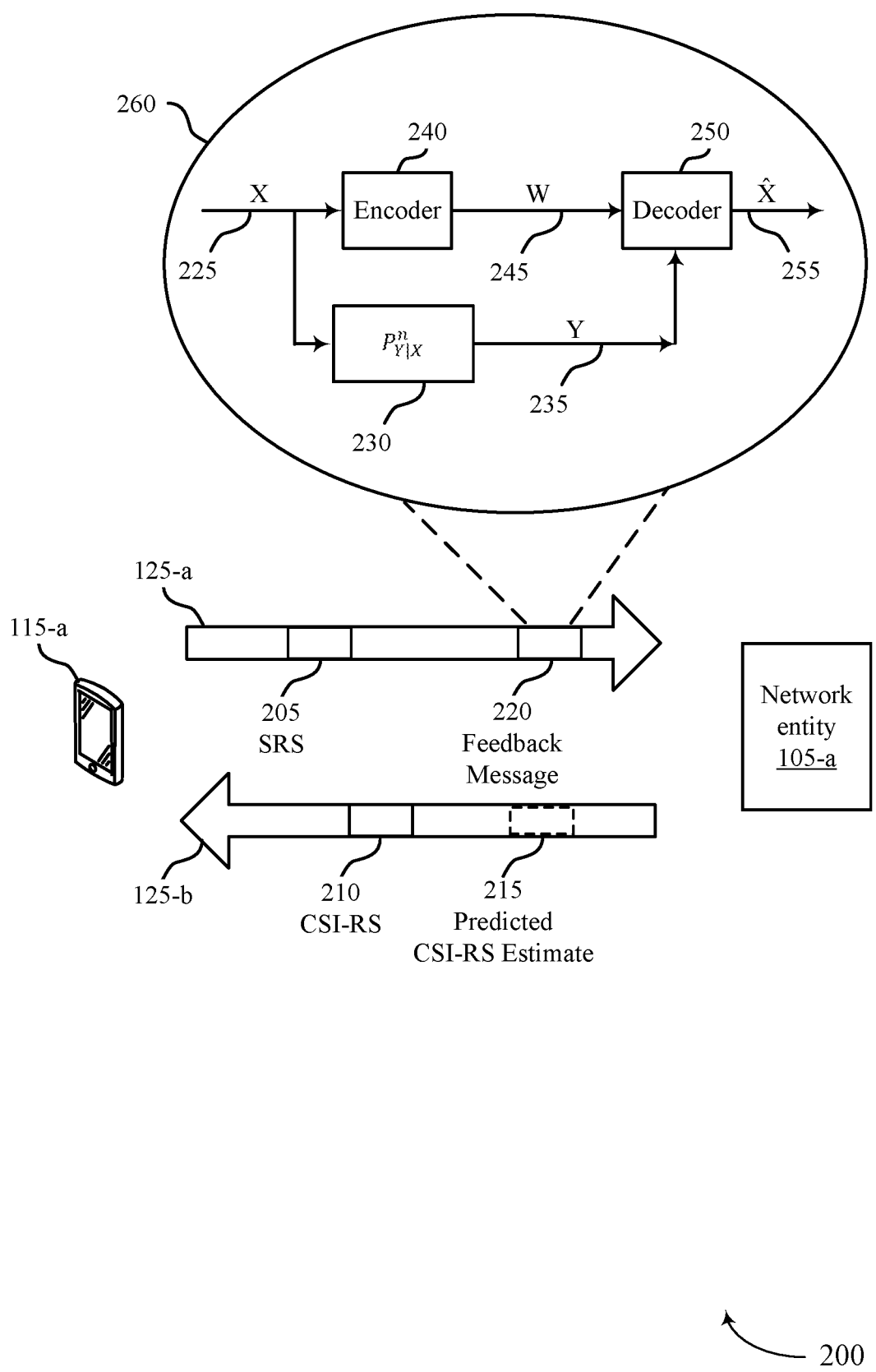
FIG. 2 illustrates an example of a wireless communications system that supports CLICT and enhancement with distributed source coding in accordance with one or more aspects of the present disclosure.

FIG. 2 illustrates an example of a wireless communications system 200 that supports CLICT and enhancement with distributed source coding in accordance with one or more aspects of the present disclosure. In some examples, the wireless communications system 200 may be implemented by one or more aspects of the wireless communications system 100. For instance, a UE 115-a may be an example of a UE 115, and a network entity 105-a may be an example of a network entity 105, as described with reference to FIG. 1. Additionally, a communication link 125-a and a communication link 125-b may be examples of communication links 125 described with reference to FIG. 1. The communication link 125-a, the communication link 125-b, or both, may be associated with the channel used for signaling exchanged between the UE 115-a and the network entity 105-a. Additionally, the communication links 125 may be associated with the channel on which the UE 115-a and the network entity 105-a may perform channel measurements.

As an example, the UE 115-a may measure CSI based on a downlink CSI-RS and perform CSI compression using Wyner-Ziv coding (e.g., to quantize the CSI or channel state values) and map the binary bits to syndromes using a channel code, such as a low-density parity check code, to achieve compression of the CSI. On the network entity 105 receiver side, the receiver could use the syndrome in conjunction with the side information (e.g., SRS-based channel estimation or previous CSI report) at the network entity 105-a side.

In some examples, the UE 115-a and the network entity 105 may jointly take a tightly coupled CSI measurement to perform a CLICT transmission. For example, the UE 115-a may transmit an SRS 205 to the network entity 105-a, and the network entity 105-a may measure the SRS 205. In some examples, the UE 115-a may send the SRS 205 midband (e.g., in a middle frequency range). The network entity 105-a may have a large quantity of antennas (e.g., ranging from 256 antennas to 1024 antennas), which may be greater than a quantity of antennas at the UE 115-a (e.g., 4 antennas). In some examples, the network entity 105-a may estimate the channel by using the entire quantity of antennas. In other examples, the network entity 105-a may estimate the channel by using a subset of antennas. The network entity 105 may make a channel estimate for the channel based on measuring the SRS 205. Based on the SRS 205, the network entity 105 may generate a precoder. The network entity 105-a may use the precoder to beamform a CSI-RS 210.

The network entity 105-a may beamform the CSI-RS 210 in accordance with the channel estimate of the SRS 205. Additionally, or alternatively, the network entity 105-a may beamform the CSI-RS 210 based on a previous CSI feedback for a previous CSI-RS, measured and reported by the UE 115-a. Based on the initial estimate of the SRS 205, the network entity 105 may form initial beams and send the CSI-RS 210 downlink by using a quantity of ports (e.g., ranging between 32 and 128 ports). In some examples, the network entity 105 may beamform the CSI-RS 210 in a lower dimension than the dimension used to acquire the channel estimate of the SRS 205 (e.g., ranging between 4 and 8 CSI-RS antenna ports, which may be a reduced quantity of ports relative to the quantity of layers used to acquire the channel estimate of the SRS 205). The UE 115-a may receive the CSI-RS 210 and further measure the CSI-RS 210 transmitted downlink. In some examples, the UE 115-a may measure the beamformed channel in the downlink based on a demodulation reference signal (DMRS).

In some implementations, the UE 115-a may use distributed source coding to encode a channel measurement. A schematic diagram 260 illustrates concepts of the distributed source coding used to encode the measurement of the CSI-RS 210. In some implementations, the UE 115-a may encode the measurement of the CSI-RS 210. For example, the UE 115-a may take a CSI measurement 225. The CSI measurement 225 may be represented as X, as illustrated with respect to FIG. 2. In some examples, an encoder 240 of the UE 115-a may apply an encoding scheme to the CSI measurement 225 to generate a compressed CSI 245. As an example, the UE 115-a may perform CSI compression by Wynzer Ziv coding, i.e., to quantize the channel state values and map the binary bits to syndromes using a channel code, such as a low-density parity check code. The compressed CSI 245 may be represented as W, as illustrated with respect to FIG. 2. The compressed CSI 245 may be a compressed (e.g., abbreviated) version of the CSI measurement 225, which may be recovered from the side of the network entity 105-a based on the CSI side information. In some examples, the UE 115-a may generate the compressed CSI 245 by assuming information known at the network entity 105-a. The compressed CSI 245 may be generated by abbreviating the CSI measurement 225 such that finer bits expected to be observed with substantial noise from the perspective of the network entity 105-a are extracted from the CSI measurement 225.

In some cases, the UE 115-a may receive control signaling indicating the encoding scheme that the encoder 240 may use for encoding the CSI measurement 225 of the CSI-RS 210. In some examples, the encoding scheme may be a syndrome based encoding scheme. Accordingly, the UE 115-a may receive control signaling indicating the syndrome based encoding scheme to the network entity 105-a. Additionally, or alternatively, the encoding scheme may be a Wyner-Ziv coding scheme. Accordingly, the UE 115-a may receive control signaling indicating the Wyner-Ziv coding scheme to the UE 115-a. In some cases, the compression may not assume any information from the network entity 105-a side.

In some examples, the UE 115-a may transmit a message indicating a capability to encode a CSI-RS measurement. For instance, the UE 115-a may transmit a capability message to the network entity 105-a. The capability message may contain an indication conveying that the UE 115-a is capable of encoding a CSI-RS measurement of the CSI-RS 210 assuming side information at the network entity 105-a receiver side. Alternatively, the capability message may contain an indication conveying that that the UE 115-a is unable to perform the encoding.

As illustrated in the schematic diagram 260, the CSI measurement 225 may include information already known to the network entity 105-a and information which may not be known to the network entity 105-a. For example, the network entity 105-a may have a noisy observation of the channel based on the channel estimate 235 of the SRS 205. The network entity 105-a may be able to determine some information from the channel estimate 235 with high definition, resolution, or quality, but some information from the channel estimate 235 may be lossy or uncertain. Therefore, the UE 115-a may report information which is not known, or is expected to be lossy, uncertain, or low quality, to the network entity 105-a in the compressed CSI 245. The UE 115-a may report information which is not determined from the channel estimate 235 instead of reporting information which is already known to the network entity 105-a in order to supplement channel estimation refinement.

For example, the channel estimate 235 of the SRS 205 may be represented as Y, as illustrated with respect to FIG. 2. In some examples, the UE 115-a may derive the channel estimate 235 of the SRS 205 that is measured at the network entity 105-a based on applying a function 230 to the CSI measurement 225 observed by the UE 115-a. The function 230 may be associated with the same encoding scheme used by the encoder 240. In some examples, the channel estimate 235 of the SRS 205 may be a noisy observation of signaling exchanged between the UE 115-a and the network entity 105-a on a channel. For example, a binary representation of the channel estimate 235 may be $b_0b_1b_2b_3b_4b_5$, where the first string of bits $b_0b_1b_2$ may indicate a first portion of information included in the channel estimate 235 and $b_3b_4b_5$ may indicate a second portion of information included in the channel estimate 235. In some examples, the network entity 105-a may determine that $b_0b_1b_2$ is a cleaner observation of signaling than $b_3b_4b_5$. For example, the network entity 105-a may determine that $b_0b_1b_2$ is accurately observed with minimal noise, and the network entity 105-a may determine that $b_3b_4b_5$ is a poorly observed with a considerable noise. Accordingly, the bits $b_0b_1b_2$ may be finer (e.g., more accurately or precisely observed) than $b_3b_4b_5$.

In some examples, the compressed CSI 245 generated by encoder 240 and the channel estimate of the SRS 205 may each include different portions of information associated with an estimated channel observed at the UE 115-a, such as the CSI measurement 225. In comparison with the channel estimate 235, the CSI measurement 225 may be a cleaner observation of signaling exchanged between the UE 115-*a* and the network entity 105-*a* on the channel. For example, a binary representation of the CSI measurement 225 may be $b_0b_1b_2b_6b_7b_8$, where a third string of bits $b_6b_7b_8$ contains less noise than $b_3b_4b_5$. Accordingly, $b_6b_7b_8$ may be a finer string of bits than $b_3b_4b_5$. The UE 115-*a* may transmit the compressed CSI 245 to help the network entity 105-*a* acquire a more accurate observation of the signaling exchanged between the UE 115-*a* and the network entity 105-*a*. For example, instead of transmitting the entire channel estimate (e.g., $b_0b_1b_2b_6b_7b_8$), the UE 115-*a* may transmit a portion of the channel estimate to the network entity 105-*a*, where the portion transmitted by the UE 115-*a* contains the finer bits $b_6b_7b_8$ of the channel estimate to the network entity 105-*a*. By encoding the CSI measurement 225, the UE 115-*a* may approximate the CSI measurement 225 into the compressed CSI 245 that can be used from the network entity 105-*a* side to refine CSI estimation at the network entity 105-*a* in conjunction with an SRS CSI estimate or a previous CSI report from the UE 115-*a*.

The UE 115-*a* may transmit a feedback message 220. The feedback message 220 may contain at least partial CSI observed by the UE 115-*a*. That is, the UE 115-*a* may determine CSI from the perspective of the UE 115-*a* based on measuring the CSI-RS 210 to obtain the channel estimate, and the UE 115-*a* may include at least partial CSI observed by the UE 115-*a* in the feedback message 220. In some aspects, the feedback message 220 may contain the compressed CSI 245. For example, the network entity 105-*a* may receive the compressed CSI 245 in the feedback message 220. Based on the compressed CSI 245 and the channel estimate 235 of the SRS, the network entity 105-*a* may formulate a refined precoding to improve beamforming performance (e.g., further null out interlayer interference, such as noise, for the UE 115-*a*). In some examples, the UE 115-*a* may assume, or determine, information associated with the channel estimate 235 of the SRS 205, and the UE 115-*a* may use the assumed information to generate the compressed CSI 245. Alternatively, the UE 115-*a* may generate the compressed CSI 245 without assuming information associated with the channel estimate 235 of the SRS 205. The UE 115-*a* may transmit the feedback message 220 uplink on a midband (e.g., a middle frequency range) or a lowerband (e.g., a low frequency range).

By enabling the UE 115-*a* to transmit signaling such as the feedback message 220 uplink across a wider bandwidth of frequencies, the UE 115-*a* may boost the link budget for uplink communication. In some aspects, the UE 115-*a* may transmit the feedback message 220 in a different frequency band than the CSI-RS 210 is received. For example, the network entity 105-*a* may transmit the CSI-RS on a midband, and the UE 115-*a* may transmit the feedback message 220 on a low band.

The network entity 105-*a* may decode the compressed CSI 245 upon receiving the feedback message 220. In some examples, process for the network entity 105-*a* to receive the feedback message 220 may include a process to decode the compressed CSI 245. The network entity 105-*a* may decode the compressed CSI 245 based on a decoding scheme and use the decoded compressed CSI 245 to obtain the CSI measurement 225. For example, the network entity 105-*a* may include a decoder 250, and the decoder 250 may use the decoding scheme to decode the compressed CSI 245. In some examples, the decoding scheme may be a syndrome based decoding scheme. Additionally or alternatively, the decoding scheme may be a Wyner-Ziv decoding scheme. The syndrome based decoding scheme may be associated with the syndrome-based encoding scheme. For example, the network entity 105-*a* may decode the compressed CSI 245 that was encoded by an encoding scheme by using a decoding scheme reciprocal to the encoding scheme. Additionally or alternatively, the Wyner-Ziv decoding scheme may be associated with the Wyner-Ziv encoding scheme. For example, the network entity 105-*a* may decode the compressed CSI 245 that was encoded by a Wyner-Ziv encoding scheme by using a Wyner-Ziv decoding scheme reciprocal to the Wyner-Ziv encoding scheme. For example, for a Wyner-Ziv encoded CSI using a low-density parity check code, a receiver side could initiate decoding using side information and perform low-density parity check decoding on the side information initiated log-likelihood ratios and the syndromes transmitted from UE 115-*a* side.

The decoder 250 may receive the compressed CSI 245 together with the channel estimate 235 of the SRS 205. Based on the decoding scheme, the decoder 250 may fuse the compressed CSI 345 and the channel estimate 235 of the SRS 205 to generate a recovered CSI measurement 255, which may be illustrated as $\hat{X}$ with reference to FIG. 2. The recovered CSI measurement 255 may be an accurate and precise approximation of the CSI measurement 225 observed by the UE 115-*a*. The network entity 105-*a* may precode (e.g., beamform) downlink data based on the recovered CSI measurement 255. For example, the UE 115-*a* may receive downlink data that is beamformed based on the recovered CSI measurement 255 generated from the channel estimate 235 of the SRS 205 and the compressed CSI 245.

In some examples, the UE 115-*a* may receive a grant scheduling downlink data. For example, the network entity 105 may transmit a resource grant to the UE 115-*a*, and the resource grant may indicate resources that may be used to receive scheduled downlink data. Based on the recovered CSI 245 generated from the channel estimate 235 of the SRS 205 and the compressed CSI 245, the UE 115-*a* may monitor for the downlink data. By monitoring for the downlink data scheduled by the received grant, the UE 115-*a* may receive the downlink data, which may include the beamformed downlink data precoded by the network entity 105-*a* based on the recovered CSI measurement 255.

In some implementations, the network entity 105-*a* may specify and/or send an expected downlink channel to the UE 115-*a*, and the UE 115-*a* may feedback the correction to expected downlink channel so that the network entity may perform channel estimation more accurately. For instance, the UE 115-*a* may receive a predicted CSI-RS estimate from the network entity 105-*a*. The network entity 105-*a* may generate a prediction of the CSI-RS estimate based on prior information that the network entity 105-*a* is aware of regarding an identify or characteristic of the channel. In addition to or instead of receiving the compressed CSI 245 in the feedback message 220 based on distributed source coding (e.g., Wyner-Ziv coding), the UE 115-*a* may receive CSI feedback of the difference between the predicted CSI-RS estimate and the CSI-RS estimate observed by the UE 115-*a* in the feedback message 220. That is, the UE 115-*a* may receive the feedback message 220, and the feedback message 220 may contain the estimation error (or the quantized version of such) of the predicted CSI-RS estimate 215 generated by the network entity 105-*a*.

In some examples, the network entity 105-*a* may signal a targeted beamformed channel to the UE 115-*a* that may be the same or different from the observed channel. For instance, the network entity 105-*a* may intend to precode the channel (e.g., the CSI-RS 210) to be an identity matrix. From the perspective of the UE 115-*a*, the precoded channel (e.g., the CSI-RS 210) may not be the identity matrix due to the estimation error of the predicted CSI-RS estimate generated by the network entity 105-*a*. For instance, due to the estimation error, the precoded channel may have a distribution that is concentrated around the identity matrix, but not identical to the identity matrix. In some examples, a non-uniform codebook may be used with a mean centered around the targeted beamformed channel. The non-uniform codebook may be different from the traditional MIMO codebook design that assumes that the channel is unknown. In some examples, the targeted beamformed channel may be hard-coded and/or preconfigured for the UE 115-*a*. In such examples, the UE 115-*a* may be preconfigured with a diagonal matrix structure associated with the targeted beamformed channel, and the UE 115-*a* may receive signaling (e.g., indicating the magnitude of diagonal elements associated with the targeted beamformed channel and the diagonal matrix structure). Additionally, or alternatively, the UE 115-*a* may receive the targeted beamformed channel, such as the CSI-RS 210, from the observation of the CSI-RS 210 at the network entity 105-*a*.

Figure 3:
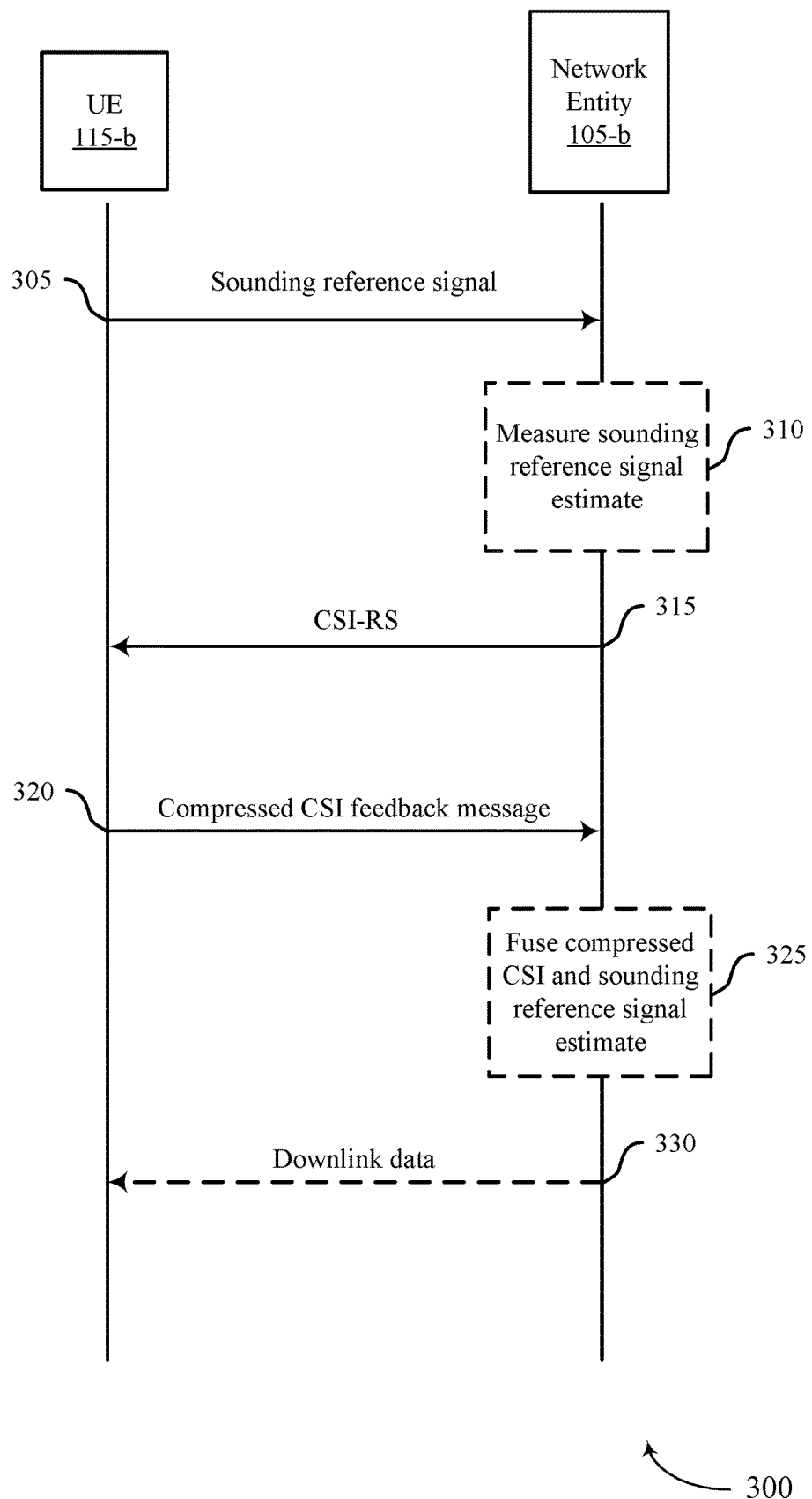
FIG. 3 illustrates an example of a process flow that supports CLICT and enhancement with distributed source coding in accordance with one or more aspects of the present disclosure.

FIG. 3 illustrates an example of a process flow 300 that supports CLICT and enhancement with distributed source coding in accordance with one or more aspects of the present disclosure. The process flow 300 may be implemented by a UE 115-*b* or a network entity 105-*b*, or both, which may be respective examples of a UE 115 and a network entity 105 as described with reference to FIGS. 1 and 2. In some cases, some processes or signaling of the process flow 300 may occur in a different order than as shown by FIG. 3. Additionally, or alternatively, some additional processes or signaling not shown may occur, or some processes or signaling shown may not occur, or both.

By implementing the process flow 300, the network entity 105-*b* may recover a high accuracy CSI for a channel between the network entity 105-*b* and the UE 115-*b*. The network entity 105-*b* may recover the complete CSI based on compressed CSI reported by the UE and either a channel estimate performed on an SRS from the UE or previously received CSI for a previously transmitted CSI-RS, or both. By implementing the process flow 300, the UE 115-*b* or the network entity 105-*b*, or both, may enable the UE 115-*b* to exploit side information about CSI at the network entity 105-*b*. By using, or exploiting, the side information about CSI at the network entity 105-*b*, the UE 115-*b* may reduce reporting overhead and reduce CSI computation at the UE 115-*b*.

For example, at 305, the UE 115-*b* may transmit an SRS to the network entity 105-*b*. At 310, the network entity 105-*b* may measure an SRS estimate. For example, the network entity 105-*b* may measure the SRS, and the network entity 105-*b* may generate the SRS estimate, or a channel estimate of the SRS, based on measuring the SRS. The channel estimate of the SRS may include estimated information associated with the channel. The estimated information may include noisy bits of data and finer bits of data containing minimal noise. By measuring the SRS and determining the channel estimate, the network entity 105-*b* may form and/or select initial beams to send a CSI-RS to the UE 115-*b*.

At 315, the network entity 105-*b* may transmit, and the UE 115-*b* may receive, a CSI-RS. In some cases, the CSI-RS may be beamformed based on the channel estimate of the SRS. For instance, based on the initial SRS estimate, the network entity 105-*b* may form beams that may be used to send the CSI-RS to the UE 115-*b*. Additionally, or alternatively, the CSI-RS may be beamformed based on a previous CSI feedback transmitted from the UE based on a previous CSI-RS. For example, the UE 115-*b* may have previously transmitted feedback including CSI (e.g., compressed CSI or high precision CSI), and a beamforming configuration for the CSI-RS received at 315 may be based on the previous feedback for the previous CSI-RS.

The UE 115-*b* may measure the CSI-RS received from the network entity 105-*b* to determine CSI or a channel estimate for the channel between the UE 115-*b* and the network entity 105-*b*. In some examples, the UE 115-*b* may encode a measurement of the CSI-RS. For example, the UE 115-*b* may encode the CSI-RS by using an encoding scheme (e.g., a syndrome based encoding scheme, a Wyner-Ziv coding scheme) assuming side information available at the network entity 105-*b* receiver. In such examples, the UE 115-*b* may generate compressed CSI based on encoding the measurement of the CSI-RS. The compressed CSI may be an abbreviated, or compressed, version of the measurement of the CSI-RS. That is, the compressed CSI include a portion of information from the measurement of the CSI-RS that may be used to supplement network entity 105-*b* side CSI measurement to derive a more accurate CSI measurement. The compressed CSI may include bits of data which contain less noise and interference in comparison to corresponding bits of data associated with the SRS estimate. In some cases, the UE 115-*b* may perform a quantizer (e.g., scalar or vector) for the encoding, which may be followed by the syndrome-based encoding scheme.

In some examples, the UE 115-*b* may apply the encoding scheme to the measurement based on an assumed or expected CSI-RS channel estimate at the network entity 105-*b*. For example, the UE 115-*b* may encode the CSI-RS measurement based on information which the UE 115-*b* assumes the network entity 105-*b* has based on the channel estimate for the SRS or based on a previous CSI feedback message. The UE 115-*b* may encode the measurement of the CSI-RS based on transmitting a capability message to the network entity 105-*b*, indicating that the UE 115-*b* is capable of supporting transmission of compressed CSI or performing CLICT-based procedures, or both.

At 320, the UE 115-*b* may transmit, and the network entity 105-*b* may receive, a compressed CSI feedback message to the network entity 105-*b*. The compressed CSI feedback message may contain the compressed CSI. Accordingly, the compressed CSI feedback message may contain CSI observed by the UE 115-*b* that is in an abbreviated form. In some cases, a granularity, or amount, of feedback included in the CSI feedback message, or in the compressed CSI, may be based on a statistical dependency between an expected or predicted CSI-RS estimate determined at the network entity 105-*b* and the CSI-RS estimate determined at the UE 115-*b*. Additionally, or alternatively, the granularity, or the amount, of feedback may be based on a quality of the feedback channel.

In some aspects, the UE 115-*b* may receive, and the network entity 105-*b* may transmit, an indication of the granularity, amount, or both, of the feedback included in the compressed CSI. For example, the UE 115-*b* may receive, from the network entity 105-*b*, signaling that indicates a compression granularity or an amount of syndrome bits for the compressed CSI. Additionally or alternatively, a CSI compression rate may be based on a correlation between network-side CSI (e.g., a CSI estimate performed by the network entity 105-*b*) and CSI measured at the UE 115-*b* based on a downlink reference signal, a quality of the downlink CSI, a capacity of a feedback channel used to transmit the feedback message (e.g., the compressed CSI feedback message or a high precision CSI), or any combination thereof. For example, the UE 115-*b* may determine a CSI compression rate based on a function of the correlation of network entity 105-*b* side information, a quality of downlink CSI from the CSI-RS received at the UE 115-*b*, and a capacity of an uplink feedback channel.

In some examples, the feedback message indicating a difference between a predicted CSI-RS estimate and a CSI-RS estimate observed by the UE 115-*b* may be compressed using a vector quantizer, a scalar quantizer, or both, and optionally followed by lossless compression (e.g., with receiver side information in the case of CLICT), to generate the compressed CSI feedback. In some examples, the difference between the predicted CSI-RS estimate and a CSI-RS estimate observed by the UE 115-*b* may manifest in a form of non-uniform codebook centered around the expected or predicted channel estimate with codebook granularity and a feedback data rate determined by statistical dependency of UE 115-*b* side channel estimate and gNB side SRS channel estimate (or the first CSI feedback from UE 115-*b*) and the feedback channel quality.

In some examples, the UE 115-*b* may transmit the compressed CSI feedback message in a different frequency band than the CSI-RS is received. For example, the UE 115-*b* may transmit the compressed CSI feedback message at a frequency that is higher, lower, or the same as the frequency at which the CSI-RS is received. The network entity 105-*b* may decode the compressed CSI feedback message based on receiving the compressed CSI feedback message. Accordingly, the network entity 105-*b* may decode the compressed CSI to and use the decoded compressed CSI to obtain the measurement of the CSI-RS that was made by the UE 115-*b*.

At 325, the network entity 105-*b* may fuse, or combine, the compressed CSI and the SRS estimate to recover the CSI of the CSI-RS that was measured by the UE 115-*b*. The network entity 105-*b* may fuse the compressed CSI and the SRS estimate based on the compressed CSI feedback message. For example, the network entity 105-*a* may decode the compressed CSI by applying a decoding scheme to the compressed CSI indicated by the compressed CSI feedback message and the SRS estimate. The decoding scheme may combine fine bits of data extracted from the compressed CSI feedback message with other bits of data extracted from the SRS estimate to generate and recover the CSI previously observed by the UE 115-*b* from the CSI-RS received at 315.

At 330, the network entity 105-*b* may transmit, and the UE 115-*b* may receive, downlink data. The network entity 105-*b* may beamform, or precode, the downlink data based on the recovered CSI previously generated from the channel estimate of the SRS and the compressed CSI. For example, the downlink data, a grant scheduling the downlink data, or both, may be quasi co-located with the CSI-RS or with the compressed CSI feedback message, or both. For example, a downlink control channel carrying the grant may be assumed to be quasi co-located with respect to the beamformed CSI-RS channel estimate from the UE-side. Additionally, or alternatively, the downlink data may be assumed to be quasi co-located with respect to the beamformed CSI-RS channel estate from the UE-side.

Figure 4:
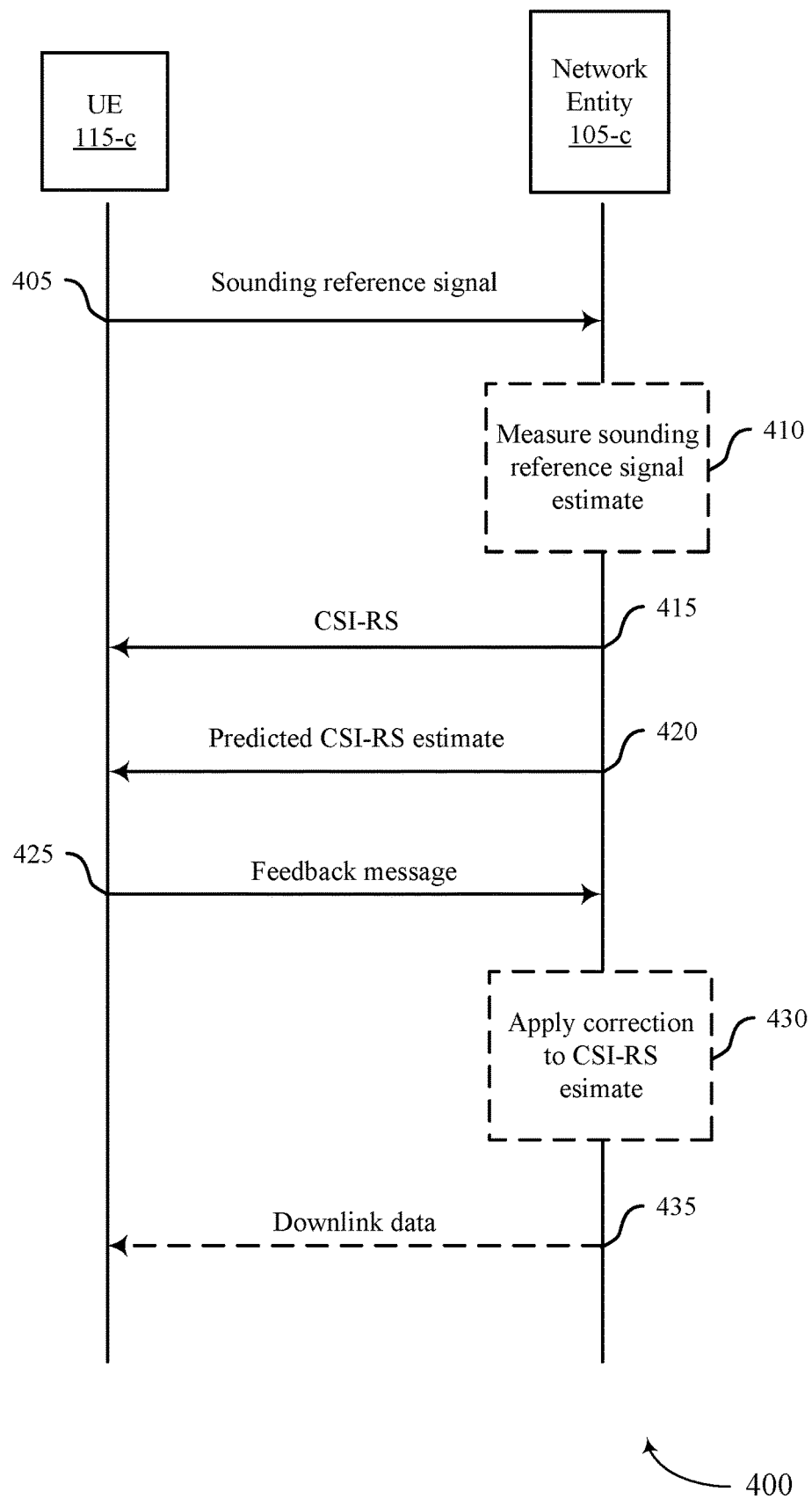
FIG. 4 illustrates an example of a process flow that supports CLICT and enhancement with distributed source coding in accordance with one or more aspects of the present disclosure.

FIG. 4 illustrates an example of a process flow 400 that supports CLICT and enhancement with distributed source coding in accordance with one or more aspects of the present disclosure. The process flow 400 may be implemented by a UE 115-*c* or a network entity 105-*c*, or both, which may be respective examples of a UE 115 and a network entity 105 as described with reference to FIGS. 1 and 2. In some cases, some processes or signaling of the process flow 400 may occur in a different order than as shown by FIG. 4. Additionally, or alternatively, some additional processes or signaling not shown may occur, or some processes or signaling shown may not occur, or both.

At 405, the UE 115-*c* may transmit, and the network entity 105-*c* may receive, an SRS. At 410, the network entity 105-*c* may measure the SRS to determine a channel estimate. For example, the network entity 105-*c* may measure the SRS, and the network entity 105-*c* may generate the SRS estimate, or a channel estimate of the SRS, based on measuring the SRS. The channel estimate of the SRS may include estimated information associated with the channel, such as channel quality, precoding information, rank information, layer information, or any combination thereof. The network entity 105-*c* may determine CSI based on the measurement of the SRS. The CSI determined form the SRS estimate may include noisy bits of data and finer bits of data containing minimal noise. Based on the SRS estimate, the network entity 105-*c* may form or select initial beams to transmit a CSI-RS to the UE 115-*c*.

At 415, the network entity 105-*c* may transmit, and the UE 115-*b* may receive, a CSI-RS. The CSI-RS may be beamformed based on the channel estimate of the SRS. For instance, based on the initial SRS estimate, the network entity 105-*c* may form beams to transmit the CSI-RS to the UE 115-*c*.

At 420, the network entity 105-*c* may transmit, and the UE 115-*c* may receive, an indication of a predicted CSI-RS estimate. The predicted CSI-RS estimate may correspond to an expected or predicted CSI-RS estimate at the UE-side, as determined (e.g., estimated or predicted) by the network entity 105-*c*. For example, the network entity 105-*c* may indicate the channel, or CSI-RS estimate, that the network entity 105-*c* expects to be seen from the perspective of the UE 115-*c*. In some examples, the predicted CSI-RS estimate may be based on the channel estimate of the SRS (or from previous CSI feedback). For example, the network entity 105-*c* may generate the predicted CSI-RS estimate based on measurements initially made by the network entity 105-*c* upon receiving the SRS at 405.

In some cases, the predicted, or expected, CSI-RS estimate may be signaled via RRC signaling, DCI, some other type of signaling, or any combination thereof. Additionally or alternatively, the predicted, or expected, CSI-RS estimate may be predetermined or indicated in a wireless specification set by a standards organization. For example, the predicted CSI-RS estimate may be implicitly indicated based on a beamformed channel which is expected to be a given matrix (e.g., an identity matrix), which may be communicated or indicated between the UE 115-*c* and the network entity 105-*c*. In some examples, the predicted or expected CSI-RS estimate, or a portion of the estimate such as magnitude, may be signaled for a wideband or per sub-band.

At 425, UE 115-*c* may transmit, and the network entity 105-*c* may receive, a feedback message. The feedback message may indicate a difference between the predicted CSI-RS estimate and a CSI-RS estimate observed by the UE 115-*c*. That is, the feedback message may indicate the error of the predicted CSI-RS estimate with respect to the CSI-RS estimate actually observed by the UE 115-*c*.

In some examples, the difference between the predicted CSI-RS estimate and the CSI-RS estimate as observed by the UE 115-*c* may be indicated based on a non-uniform codebook. The non-uniform codebook may be centered around the expected or predicted CSI-RS estimate. For example, the non-uniform codebook may use the expected or predicted CSI-RS estimate for the non-uniform codebook, where the predicted CSI-RS estimate is treated as the identity matrix for the non-uniform codebook.

At 430, the network entity 105-*c* may apply a correction to the channel such that the network entity 105-*c* may acquire a more accurate channel estimation, where the applied correction may be based on CSI feedback from the UE 115-*c*. For example the network entity 105-*a* may refine the predicated CSI-RS estimate based on the indicated difference between the predicted CSI-RS estimate and the CSI-RS estimate observed by the UE 115-*c*.

At 435, the network entity 105-*c* may transmit, and the UE 115-*c* may receive, downlink data. The network entity 105-*c* may beamform, or precode, the downlink data based on CSI generated from the channel estimate of the SRS and the difference between the predicted CSI-RS estimate and the CSI-RS estimate observed by the UE 115-*c*. For example, the downlink data may be quasi co-located with respect to the beamformed CSI-RS channel estimate from the UE 115-*c* (e.g., and the UE 115-*c* may assume the downlink data is quasi co-located with respect to the beamformed CSI-RS channel estimate from the UE 115-*c*).

Figure 5:
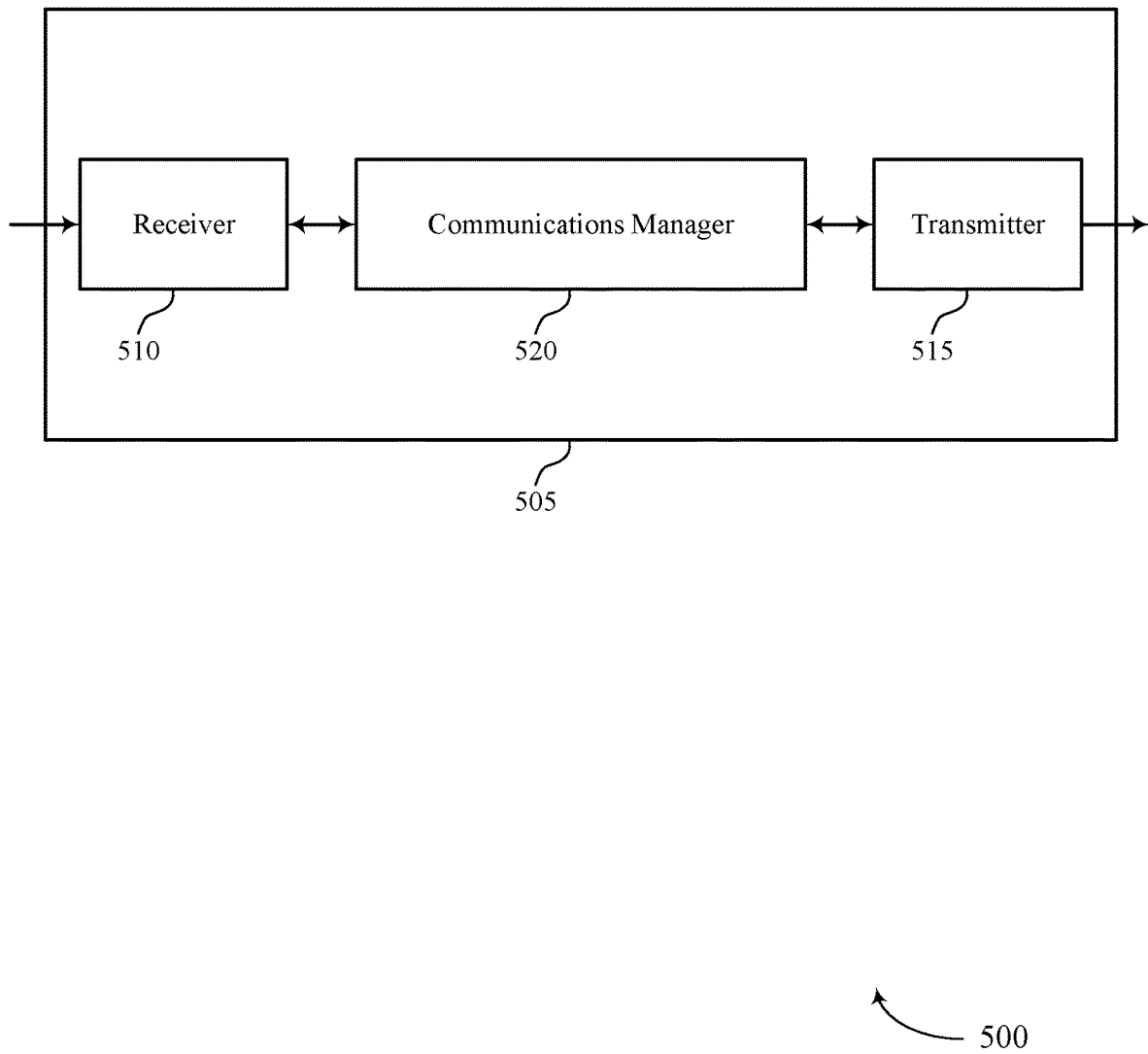
FIGS. 5 and 6 show block diagrams of devices that support CLICT and enhancement with distributed source coding in accordance with one or more aspects of the present disclosure.

FIG. 5 shows a block diagram 500 of a device 505 that supports CLICT and enhancement with distributed source coding in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to CLICT and enhancement with distributed source coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CLICT and enhancement with distributed source coding). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CLICT and enhancement with distributed source coding as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity, a CSI-RS that is beamformed based on a channel estimate of an SRS transmitted from the UE, or a previous CSI feedback transmitted from the UE based on a previous CSI-RS, or both. The communications manager 520 may be configured as or otherwise support a means for transmitting a feedback message including compressed CSI that is generated based on encoding a measurement of the CSI-RS.

Additionally, or alternatively, the communications manager 520 may support wireless communication at a UE in accordance with examples as disclosed herein. For example, the communications manager 520 may be configured as or otherwise support a means for transmitting an SRS to a network entity. The communications manager 520 may be configured as or otherwise support a means for receiving, from the network entity, a CSI-RS that is beamformed based on a channel estimate generated from the SRS. The communications manager 520 may be configured as or otherwise support a means for receiving, from the network entity, an indication of a predicted CSI-RS estimate for the UE. The communications manager 520 may be configured as or otherwise support a means for transmitting a feedback message that indicates a difference between the predicted CSI-RS estimate and a CSI-RS estimate observed by the UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by using compressed CSI. The compressed CSI may require less overhead than transmitting high precision CSI, but a network entity may be able to recover the high precision CSI from the compressed CSI and other channel estimates (e.g., a channel estimate of an SRS or a previous CSI feedback for a previous CSI-RS).

Figure 6:
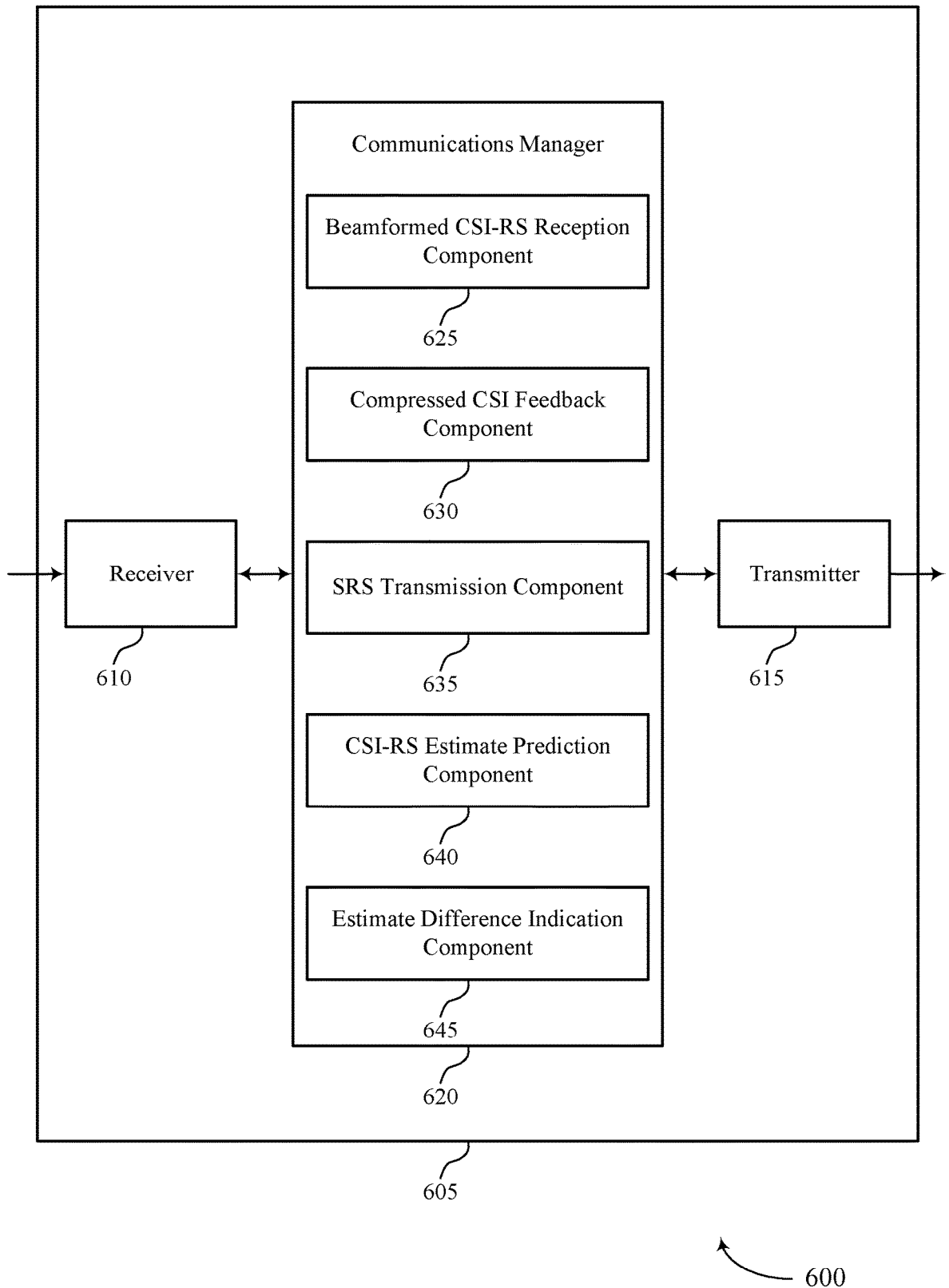

FIG. 6 shows a block diagram 600 of a device 605 that supports CLICT and enhancement with distributed source coding in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CLICT and enhancement with distributed source coding). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CLICT and enhancement with distributed source coding). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CLICT and enhancement with distributed source coding as described herein. For example, the communications manager 620 may include a beamformed CSI-RS reception component 625, a compressed CSI feedback component 630, an SRS transmission component 635, a CSI-RS estimate prediction component 640, an estimate difference indication component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The beamformed CSI-RS reception component 625 may be configured as or otherwise support a means for receiving, from a network entity, a CSI-RS that is beamformed based on a channel estimate of an SRS transmitted from the UE, or a previous CSI feedback transmitted from the UE based on a previous CSI-RS, or both. The compressed CSI feedback component 630 may be configured as or otherwise support a means for transmitting a feedback message including compressed CSI that is generated based on encoding a measurement of the CSI-RS.

Additionally, or alternatively, the communications manager 620 may support wireless communication at a UE in accordance with examples as disclosed herein. The SRS transmission component 635 may be configured as or otherwise support a means for transmitting an SRS to a network entity. The beamformed CSI-RS reception component 625 may be configured as or otherwise support a means for receiving, from the network entity, a CSI-RS that is beamformed based on a channel estimate generated from the SRS. The CSI-RS estimate prediction component 640 may be configured as or otherwise support a means for receiving, from the network entity, an indication of a predicted CSI-RS estimate for the UE. The estimate difference indication component 645 may be configured as or otherwise support a means for transmitting a feedback message that indicates a difference between the predicted CSI-RS estimate and a CSI-RS estimate observed by the UE.

Figure 7:
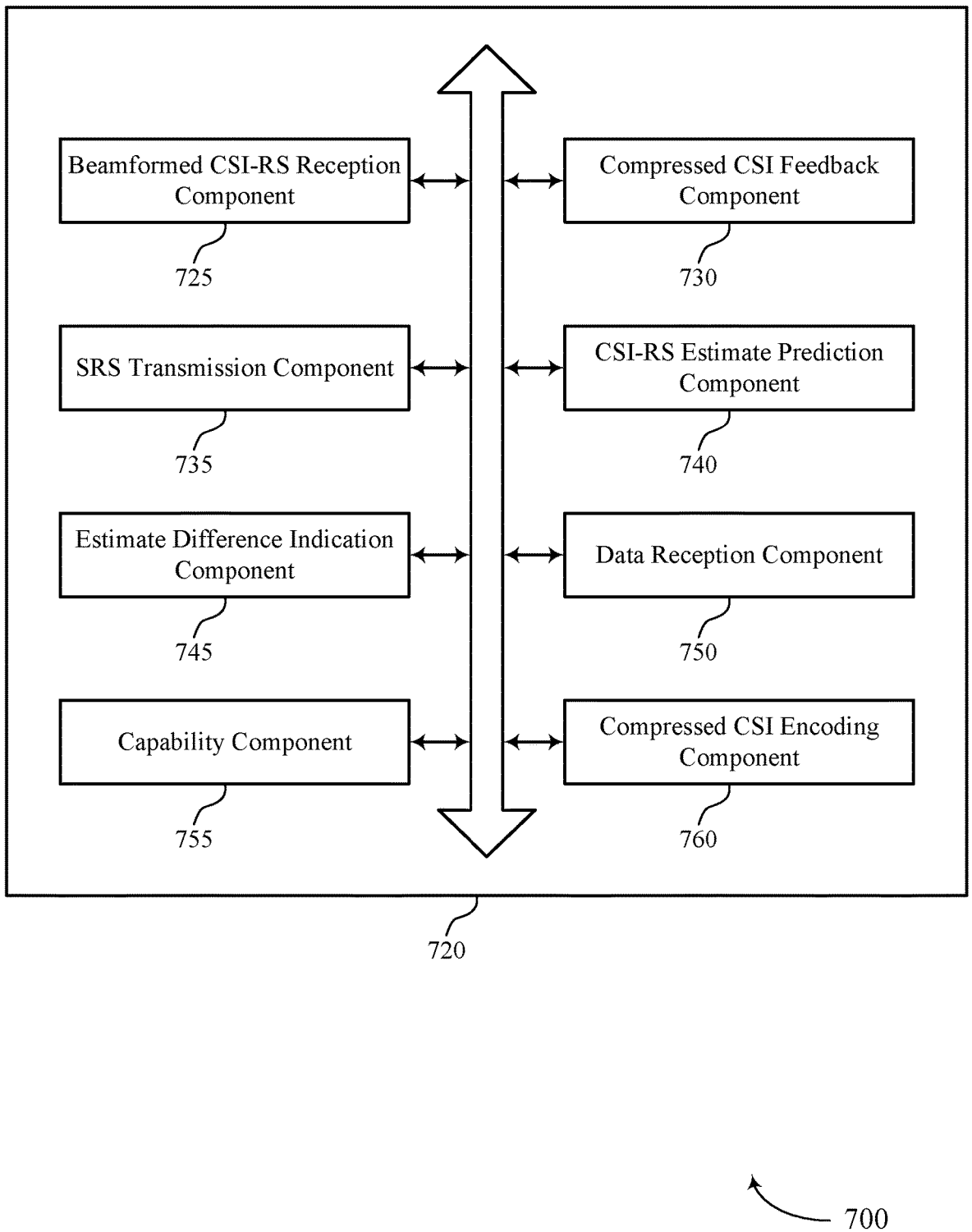
FIG. 7 shows a block diagram of a communications manager that supports CLICT and enhancement with distributed source coding in accordance with one or more aspects of the present disclosure.

FIG. 7 shows a block diagram 700 of a communications manager 720 that supports CLICT and enhancement with distributed source coding in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CLICT and enhancement with distributed source coding as described herein. For example, the communications manager 720 may include a beamformed CSI-RS reception component 725, a compressed CSI feedback component 730, an SRS transmission component 735, a CSI-RS estimate prediction component 740, an estimate difference indication component 745, a data reception component 750, a capability component 755, a compressed CSI encoding component 760, or any combination thereof. Each of these components may communicate, directly or indirectly, with one another (e.g., via one or more buses).

The communications manager 720 may support wireless communication at a UE in accordance with examples as disclosed herein. The beamformed CSI-RS reception component 725 may be configured as or otherwise support a means for receiving, from a network entity, a CSI-RS that is beamformed based on a channel estimate of an SRS transmitted from the UE, or a previous CSI feedback transmitted from the UE based on a previous CSI-RS, or both. The compressed CSI feedback component 730 may be configured as or otherwise support a means for transmitting a feedback message including compressed CSI that is generated based on encoding a measurement of the CSI-RS.

In some examples, to support transmitting the feedback message, the compressed CSI feedback component 730 may be configured as or otherwise support a means for transmitting the feedback message including the compressed CSI, where a granularity or amount of feedback in the compressed CSI is based on a statistical dependency between a predicted CSI-RS estimate at the network entity and the measurement of the CSI-RS.

In some examples, to support transmitting the feedback message, the compressed CSI feedback component 730 may be configured as or otherwise support a means for receiving, form the network entity, an indication of the granularity, amount, or both, of the feedback in the compressed CSI, where a CSI compression rate is based on a correlation of the CSI of the SRS, a quality of the CSI-RS, a capacity of a feedback channel containing the feedback message, or a combination thereof.

In some examples, the data reception component 750 may be configured as or otherwise support a means for receiving downlink data that is beamformed based on CSI generated from the channel estimate of the SRS and the compressed CSI, where the downlink data is assumed to be quasi-collocated with the feedback message.

In some examples, the capability component 755 may be configured as or otherwise support a means for transmitting a message indicating a capability to encode a CSI-RS measurement.

In some examples, to support transmitting the feedback message, the compressed CSI feedback component 730 may be configured as or otherwise support a means for transmitting the feedback message in a different frequency band than the CSI-RS is received.

In some examples, the data reception component 750 may be configured as or otherwise support a means for receiving a grant scheduling downlink data, where a downlink control channel carrying the grant is quasi-collocated with the previous CSI-RS, a predicted CSI-RS estimate, or both. In some examples, the data reception component 750 may be configured as or otherwise support a means for monitoring for the downlink data that is beamformed based on CSI generated from the channel estimate of the SRS and the compressed CSI.

In some examples, to support encoding the measurement of the CSI-RS, the compressed CSI encoding component 760 may be configured as or otherwise support a means for applying an encoding scheme to the measurement of the CSI-RS to generate the compressed CSI based on an assumed predicted CSI-RS estimate at the network entity.

In some examples, the encoding scheme is a syndrome-based encoding scheme.

In some examples, the compressed CSI encoding component 760 may be configured as or otherwise support a means for receiving control signaling indicating an encoding scheme for encoding the measurement of the CSI-RS with a corresponding compression granularity, a corresponding data rate, or both, for the feedback message.

In some examples, the compressed CSI and the channel estimate of the SRS each include different portions of information associated with an estimated channel observed at the UE.

Additionally, or alternatively, the communications manager 720 may support wireless communication at a UE in accordance with examples as disclosed herein. The SRS transmission component 735 may be configured as or otherwise support a means for transmitting an SRS to a network entity. In some examples, the beamformed CSI-RS reception component 725 may be configured as or otherwise support a means for receiving, from the network entity, a CSI-RS that is beamformed based on a channel estimate generated from the SRS. The CSI-RS estimate prediction component 740 may be configured as or otherwise support a means for receiving, from the network entity, an indication of a predicted CSI-RS estimate for the UE. The estimate difference indication component 745 may be configured as or otherwise support a means for transmitting a feedback message that indicates a difference between the predicted CSI-RS estimate and a CSI-RS estimate observed by the UE.

In some examples, to support receiving the indication of the predicted CSI-RS estimate, the CSI-RS estimate prediction component 740 may be configured as or otherwise support a means for receiving the indication of the predicted CSI-RS estimate via an RRC, a downlink control information, or both.

In some examples, to support receiving the indication of the predicted CSI-RS estimate, the CSI-RS estimate prediction component 740 may be configured as or otherwise support a means for receiving the indication of the predicted CSI-RS estimate, a portion of the CSI-RS estimate, or both, via a wideband, one or more sub-bands, or both.

In some examples, the difference between the predicted CSI-RS estimate and the CSI-RS estimate observed by the UE is indicated in accordance with a non-uniform codebook centered around the predicted CSI-RS estimate, the non-uniform codebook associated with a codebook granularity, a feedback data rate, or both.

In some examples, the codebook granularity, the feedback data rate, or both are based on a statistical dependency of the CSI-RS estimate, the channel estimate generated from the SRS, a previous CSI feedback transmitted from the UE based on a previous CSI-RS, or a combination thereof.

In some examples, the data reception component 750 may be configured as or otherwise support a means for receiving downlink data that is beamformed based on CSI generated from the channel estimate of the SRS, a previous CSI feedback transmitted from the UE based on a previous CSI-RS, or both, and the difference between the predicted CSI-RS estimate and the CSI-RS estimate observed by the UE, where the downlink data is quasi-collocated with the previous CSI-RS, the predicted CSI-RS estimate, or both.

In some examples, to support transmitting the feedback message, the estimate difference indication component 745 may be configured as or otherwise support a means for transmitting the feedback message in a different frequency band than the CSI-RS is received.

In some examples, the data reception component 750 may be configured as or otherwise support a means for receiving a grant scheduling downlink data. In some examples, the data reception component 750 may be configured as or otherwise support a means for monitoring for the downlink data that is beamformed based on CSI generated from the channel estimate of the SRS and the difference between the predicted CSI-RS estimate and the CSI-RS estimate observed by the UE.

In some examples, the indication of the predicted CSI-RS estimate is based on the channel estimate of the SRS, a previous CSI feedback transmitted from the UE based on a previous CSI-RS, or both.

Figure 8:
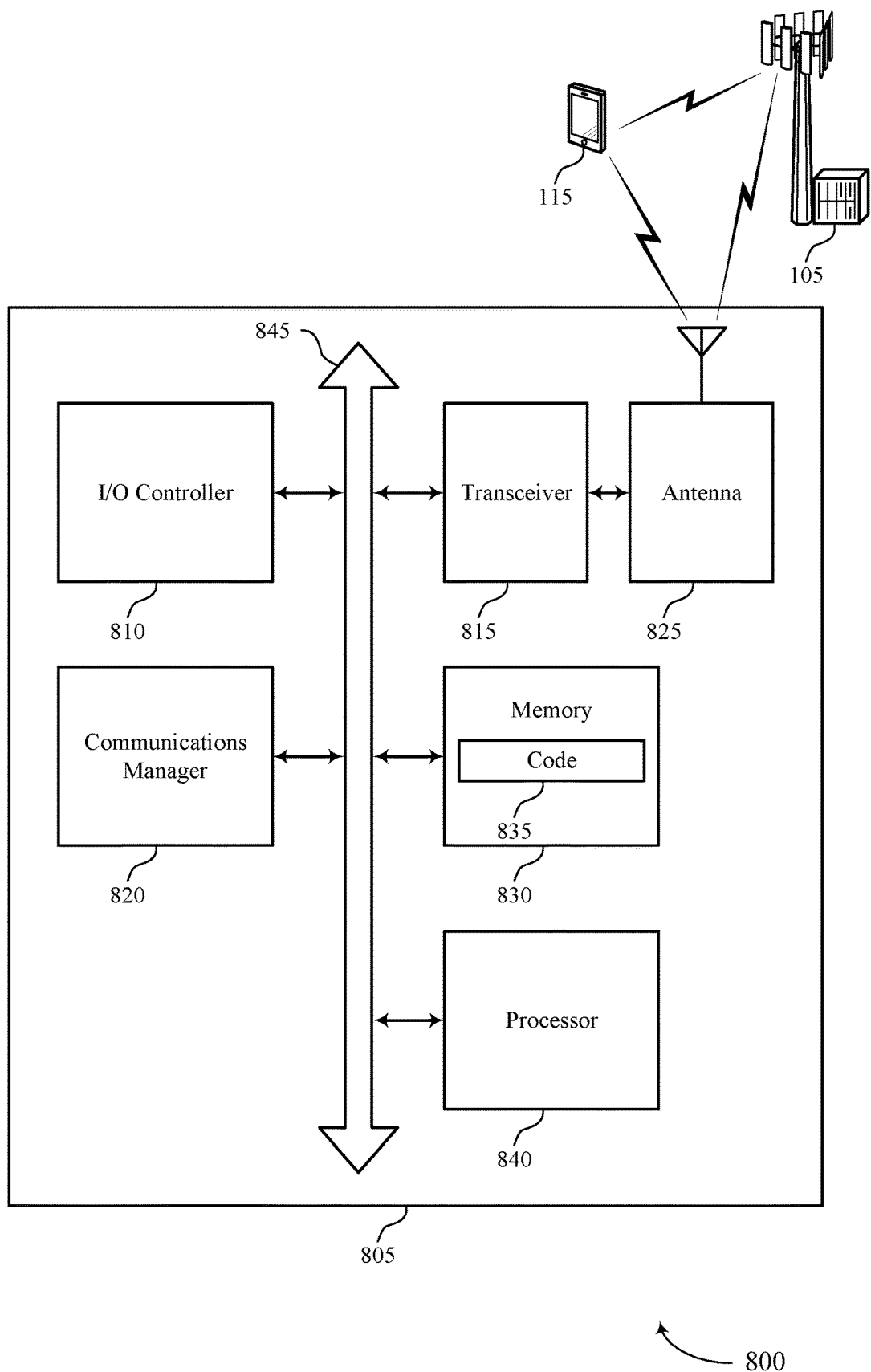
FIG. 8 shows a diagram of a system including a device that supports CLICT and enhancement with distributed source coding in accordance with one or more aspects of the present disclosure.

FIG. 8 shows a diagram of a system 800 including a device 805 that supports CLICT and enhancement with distributed source coding in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting CLICT and enhancement with distributed source coding). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, a CSI-RS that is beamformed based on a channel estimate of an SRS transmitted from the UE, or a previous CSI feedback transmitted from the UE based on a previous CSI-RS, or both. The communications manager 820 may be configured as or otherwise support a means for transmitting a feedback message including compressed CSI that is generated based on encoding a measurement of the CSI-RS.

Additionally, or alternatively, the communications manager 820 may support wireless communication at a UE in accordance with examples as disclosed herein. For example, the communications manager 820 may be configured as or otherwise support a means for transmitting an SRS to a network entity. The communications manager 820 may be configured as or otherwise support a means for receiving, from the network entity, a CSI-RS that is beamformed based on a channel estimate generated from the SRS. The communications manager 820 may be configured as or otherwise support a means for receiving, from the network entity, an indication of a predicted CSI-RS estimate for the UE. The communications manager 820 may be configured as or otherwise support a means for transmitting a feedback message that indicates a difference between the predicted CSI-RS estimate and a CSI-RS estimate observed by the UE.

By including or configuring the communications manager 820 in accordance with examples as described herein, the device 805 may support techniques for more efficient utilization of communication resources based on reporting compressed CSI. For example, a UE 115 reporting compressed CSI may require less overhead than transmitting the high precision CSI, as the compressed CSI may not include all of the information of the high precision CSI. However, a network entity may still be able to recover the high precision CSI from the compressed CSI and other channel estimates (e.g., a channel estimate of an SRS or a previous CSI feedback for a previous CSI-RS).

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of CLICT and enhancement with distributed source coding as described herein, or the processor 840 and the memory 830 may be otherwise configured to perform or support such operations.

Figure 9:
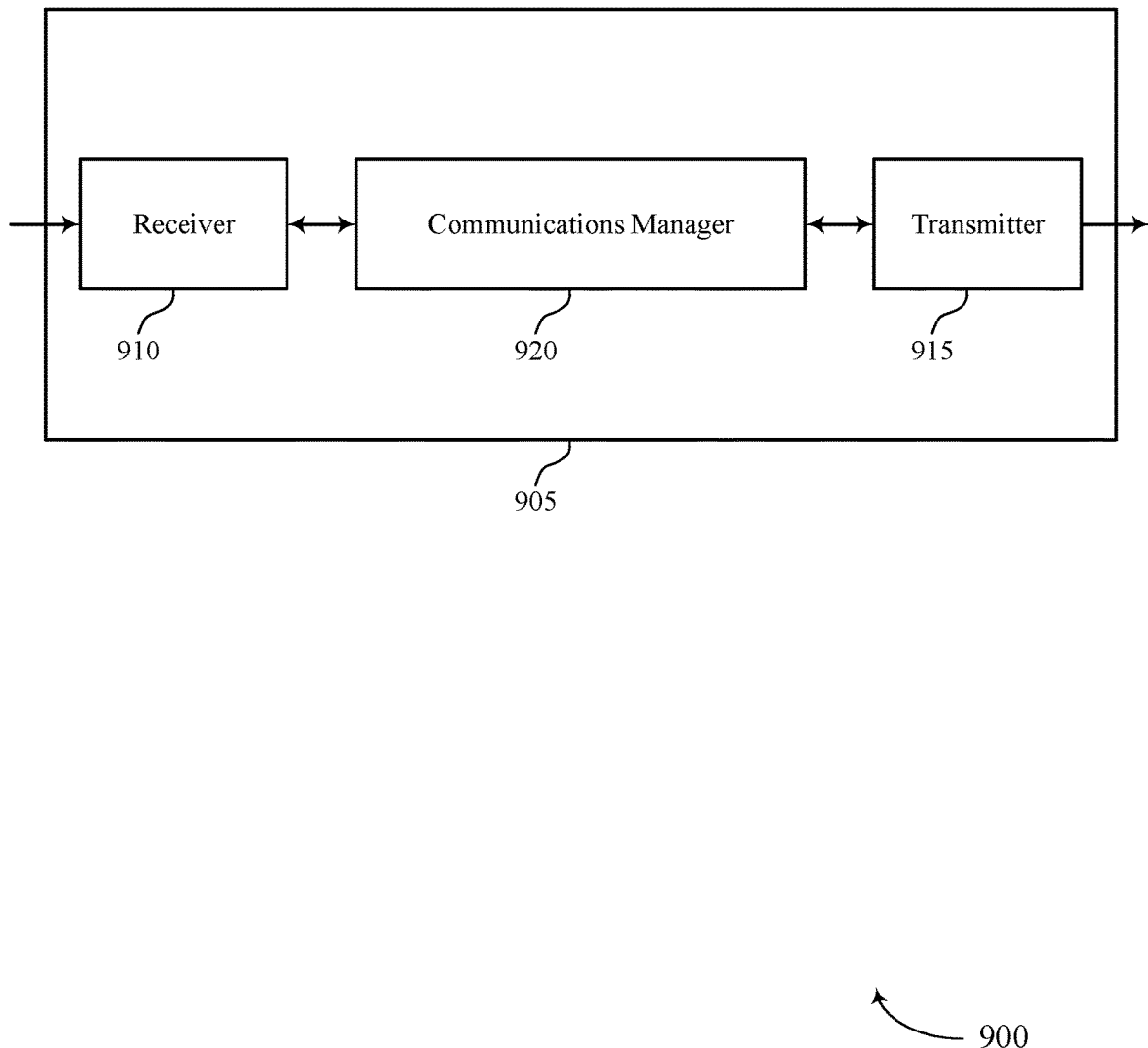
FIGS. 9 and 10 show block diagrams of devices that support CLICT and enhancement with distributed source coding in accordance with one or more aspects of the present disclosure.

FIG. 9 shows a block diagram 900 of a device 905 that supports CLICT and enhancement with distributed source coding in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of CLICT and enhancement with distributed source coding as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, a CSI-RS that is beamformed based on a channel estimate of an SRS received from the UE, or a previous CSI feedback received from the UE based on a previous CSI-RS, or both. The communications manager 920 may be configured as or otherwise support a means for receiving a feedback message including compressed CSI that is generated based on the UE encoding a measurement of the CSI-RS.

For example, the communications manager 920 may be configured as or otherwise support a means for receiving an SRS from a UE. The communications manager 920 may be configured as or otherwise support a means for transmitting a CSI-RS that is beamformed based on a channel estimate generated from the SRS. The communications manager 920 may be configured as or otherwise support a means for transmitting an indication of a predicted CSI-RS estimate for the UE. The communications manager 920 may be configured as or otherwise support a means for receiving a feedback message that indicates a difference between the predicted CSI-RS estimate and a CSI-RS estimate observed by the UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources based on reporting compressed CSI. For example, a UE 115 reporting compressed CSI may require less overhead than transmitting the high precision CSI, as the compressed CSI may not include all of the information of the high precision CSI. However, a network entity may still be able to recover the high precision CSI from the compressed CSI and other channel estimates (e.g., a channel estimate of an SRS or a previous CSI feedback for a previous CSI-RS).

Figure 10:
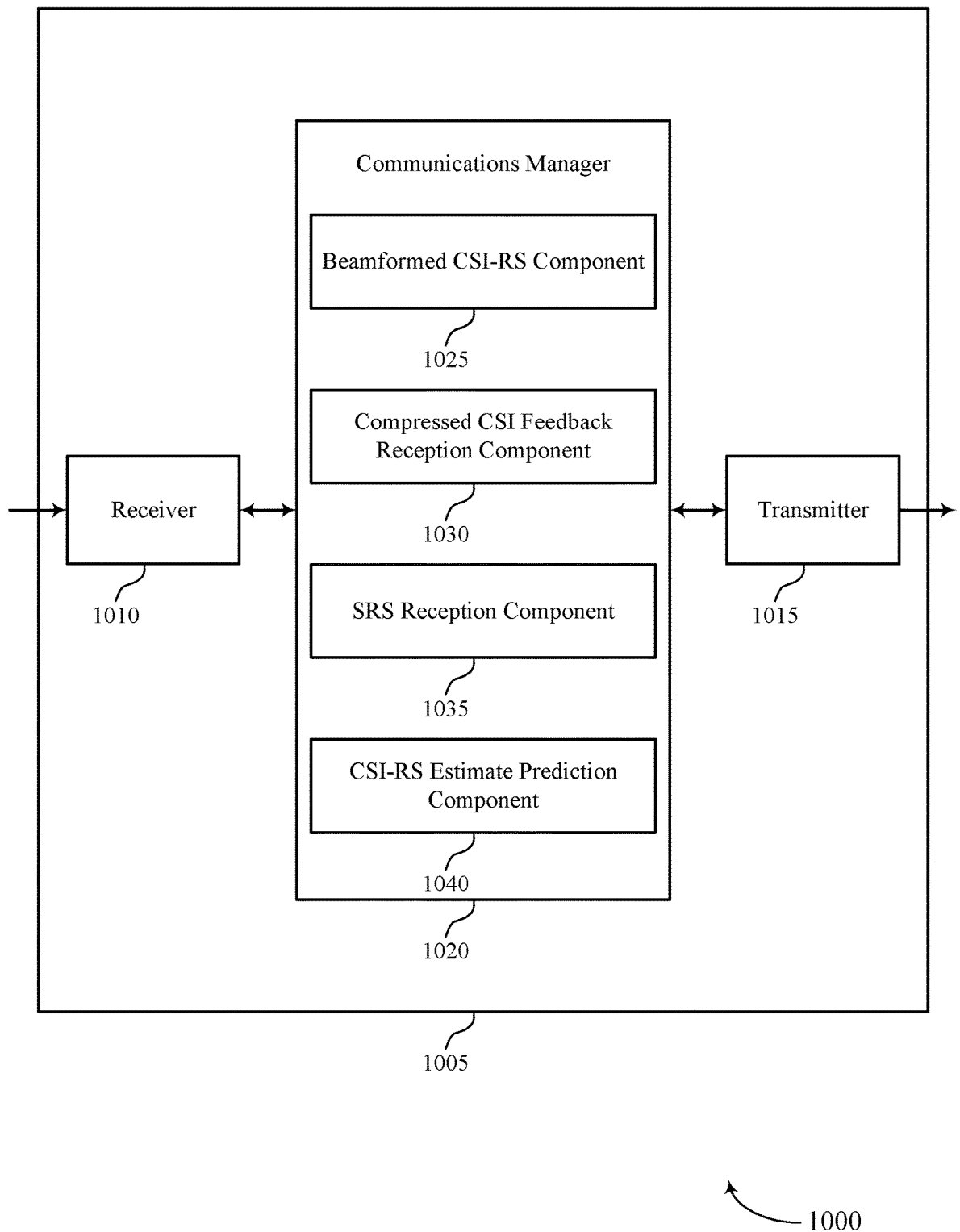

FIG. 10 shows a block diagram 1000 of a device 1005 that supports CLICT and enhancement with distributed source coding in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of CLICT and enhancement with distributed source coding as described herein. For example, the communications manager 1020 may include a beamformed CSI-RS component 1025, a compressed CSI feedback reception component 1030, an SRS reception component 1035, a CSI-RS estimate prediction component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The beamformed CSI-RS component 1025 may be configured as or otherwise support a means for transmitting, to a UE, a CSI-RS that is beamformed based on a channel estimate of an SRS received from the UE, or a previous CSI feedback received from the UE based on a previous CSI-RS, or both. The compressed CSI feedback reception component 1030 may be configured as or otherwise support a means for receiving a feedback message including compressed CSI that is generated based on the UE encoding a measurement of the CSI-RS.

The SRS reception component 1035 may be configured as or otherwise support a means for receiving an SRS from a UE. The beamformed CSI-RS component 1025 may be configured as or otherwise support a means for transmitting a CSI-RS that is beamformed based on a channel estimate generated from the SRS. The CSI-RS estimate prediction component 1040 may be configured as or otherwise support a means for transmitting an indication of a predicted CSI-RS estimate for the UE. The compressed CSI feedback reception component 1030 may be configured as or otherwise support a means for receiving a feedback message that indicates a difference between the predicted CSI-RS estimate and a CSI-RS estimate observed by the UE.

Figure 11:
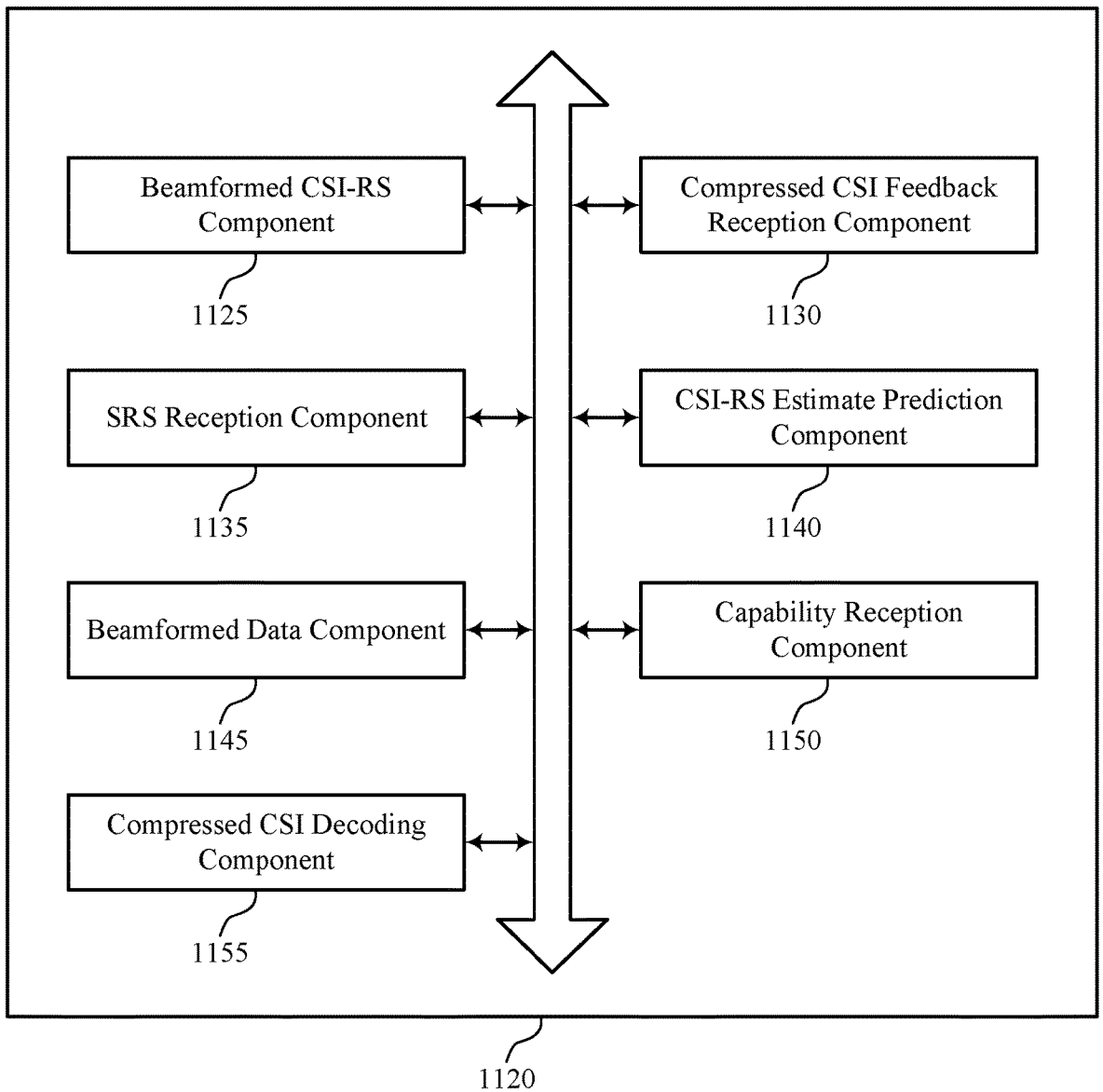
FIG. 11 shows a block diagram of a communications manager that supports CLICT and enhancement with distributed source coding in accordance with one or more aspects of the present disclosure.

FIG. 11 shows a block diagram 1100 of a communications manager 1120 that supports CLICT and enhancement with distributed source coding in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CLICT and enhancement with distributed source coding as described herein. For example, the communications manager 1120 may include a beamformed CSI-RS component 1125, a compressed CSI feedback reception component 1130, an SRS reception component 1135, a CSI-RS estimate prediction component 1140, a beamformed data component 1145, a capability reception component 1150, a compressed CSI decoding component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The beamformed CSI-RS component 1125 may be configured as or otherwise support a means for transmitting, to a UE, a CSI-RS that is beamformed based on a channel estimate of an SRS received from the UE, or a previous CSI feedback received from the UE based on a previous CSI-RS, or both. The compressed CSI feedback reception component 1130 may be configured as or otherwise support a means for receiving a feedback message including compressed CSI that is generated based on the UE encoding a measurement of the CSI-RS.

In some examples, to support receiving the feedback message, the compressed CSI feedback reception component 1130 may be configured as or otherwise support a means for receiving the feedback message including the compressed CSI, where a granularity or amount of feedback in the compressed CSI is based on a statistical dependency between a predicted CSI-RS estimate at the network entity and the measurement of the CSI-RS.

In some examples, the beamformed data component 1145 may be configured as or otherwise support a means for transmitting downlink data that is beamformed based on CSI generated from the channel estimate of the SRS and the compressed CSI.

In some examples, the beamformed data component 1145 may be configured as or otherwise support a means for transmitting a grant scheduling downlink data, including the downlink data that is beamformed based on CSI generated from the channel estimate of the SRS and the compressed CSI.

In some examples, the capability reception component 1150 may be configured as or otherwise support a means for receiving a message indicating a capability to encode a CSI-RS measurement. In some examples, the capability reception component 1150 may be configured as or otherwise support a means for determining a feedback mode of operation for the UE based on the message.

In some examples, to support receiving the feedback message, the compressed CSI feedback reception component 1130 may be configured as or otherwise support a means for receiving the feedback message in a different frequency band than the CSI-RS is transmitted.

In some examples, to support receiving the feedback message including compressed CSI, the compressed CSI decoding component 1155 may be configured as or otherwise support a means for decoding the compressed CSI based on a decoding scheme to decode the measurement of the CSI-RS.

In some examples, the compressed CSI and the channel estimate of the SRS each include different portions of information associated with the measurement of the CSI-RS.

The SRS reception component 1135 may be configured as or otherwise support a means for receiving an SRS from a UE. In some examples, the beamformed CSI-RS component 1125 may be configured as or otherwise support a means for transmitting a CSI-RS that is beamformed based on a channel estimate generated from the SRS. The CSI-RS estimate prediction component 1140 may be configured as or otherwise support a means for transmitting an indication of a predicted CSI-RS estimate for the UE. In some examples, the compressed CSI feedback reception component 1130 may be configured as or otherwise support a means for receiving a feedback message that indicates a difference between the predicted CSI-RS estimate and a CSI-RS estimate observed by the UE.

In some examples, the beamformed data component 1145 may be configured as or otherwise support a means for transmitting downlink data that is beamformed based on CSI generated from the channel estimate of the SRS, a previous CSI feedback transmitted from the UE based on a previous CSI-RS, or both, and the difference between the predicted CSI-RS estimate and the CSI-RS estimate observed by the UE, where the downlink data is quasi-collocated with the previous CSI-RS, the predicted CSI-RS estimate, or both.

In some examples, to support receiving the feedback message, the compressed CSI feedback reception component 1130 may be configured as or otherwise support a means for receiving the feedback message in a different frequency band than the CSI-RS is transmitted.

Figure 12:
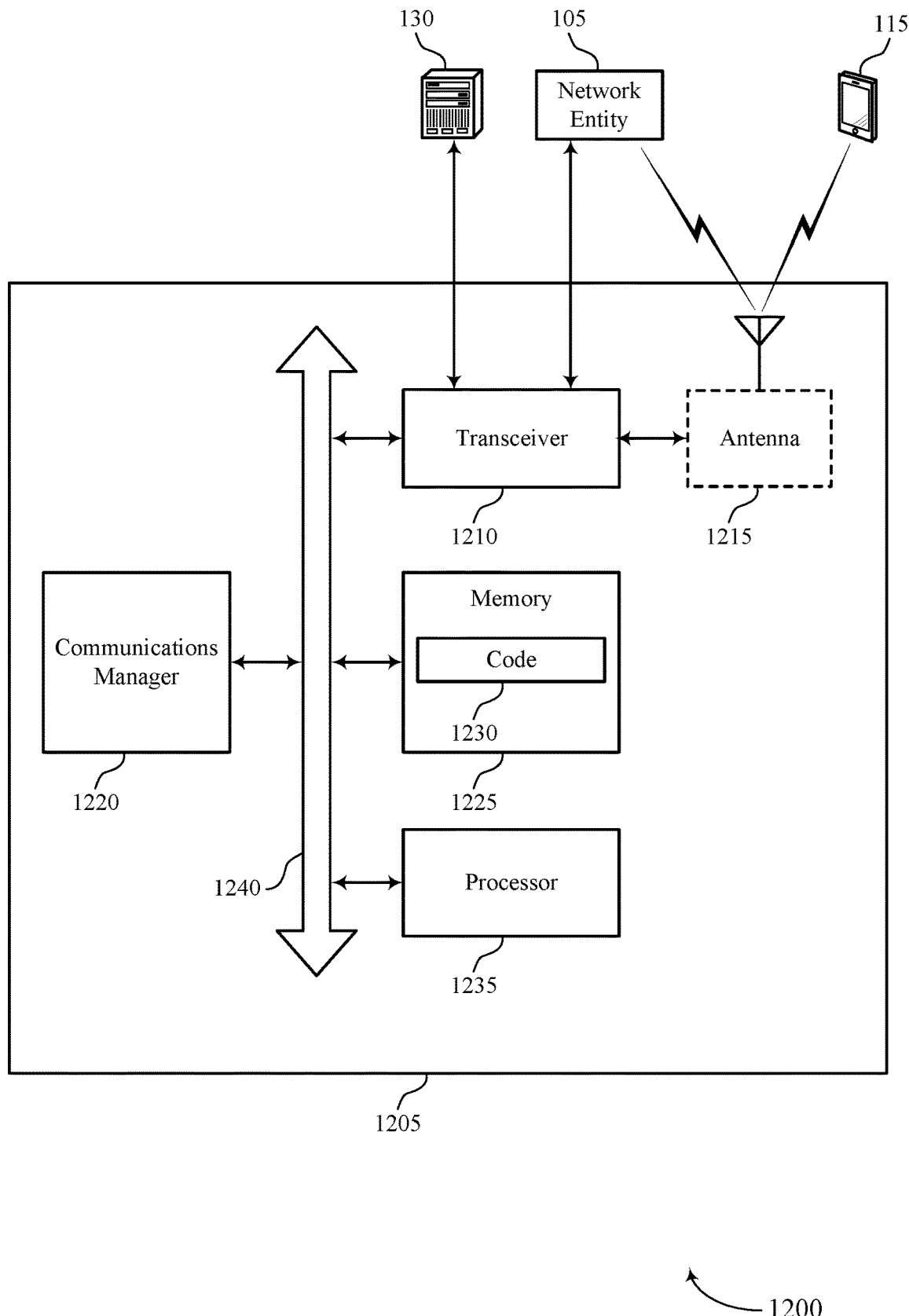
FIG. 12 shows a diagram of a system including a device that supports CLICT and enhancement with distributed source coding in accordance with one or more aspects of the present disclosure.

FIG. 12 shows a diagram of a system 1200 including a device 1205 that supports CLICT and enhancement with distributed source coding in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting CLICT and enhancement with distributed source coding). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, a CSI-RS that is beamformed based on a channel estimate of an SRS received from the UE, or a previous CSI feedback received from the UE based on a previous CSI-RS, or both. The communications manager 1220 may be configured as or otherwise support a means for receiving a feedback message including compressed CSI that is generated based on the UE encoding a measurement of the CSI-RS.

For example, the communications manager 1220 may be configured as or otherwise support a means for receiving an SRS from a UE. The communications manager 1220 may be configured as or otherwise support a means for transmitting a CSI-RS that is beamformed based on a channel estimate generated from the SRS. The communications manager 1220 may be configured as or otherwise support a means for transmitting an indication of a predicted CSI-RS estimate for the UE. The communications manager 1220 may be configured as or otherwise support a means for receiving a feedback message that indicates a difference between the predicted CSI-RS estimate and a CSI-RS estimate observed by the UE.

By including or configuring the communications manager 1220 in accordance with examples as described herein, the device 1205 may support techniques for more efficient utilization of communication resources based on reporting compressed CSI. For example, a UE 115 reporting compressed CSI may require less overhead than transmitting the high precision CSI, as the compressed CSI may not include all of the information of the high precision CSI. However, a network entity may still be able to recover the high precision CSI from the compressed CSI and other channel estimates (e.g., a channel estimate of an SRS or a previous CSI feedback for a previous CSI-RS).

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of CLICT and enhancement with distributed source coding as described herein, or the processor 1235 and the memory 1225 may be otherwise configured to perform or support such operations.

Figure 13:
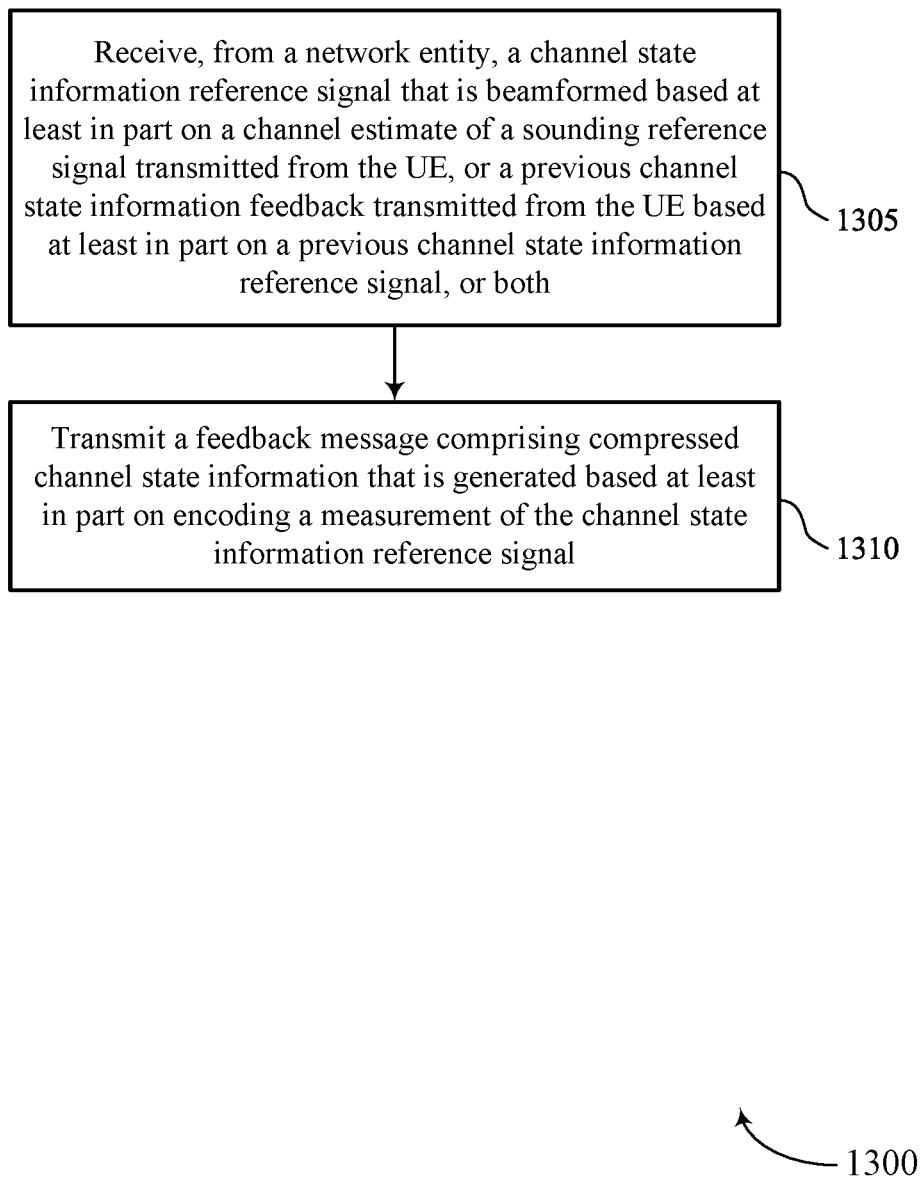
FIGS. 13 through 16 show flowcharts illustrating methods that support CLICT and enhancement with distributed source coding in accordance with one or more aspects of the present disclosure.

FIG. 13 shows a flowchart illustrating a method 1300 that supports CLICT and enhancement with distributed source coding in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a CSI-RS that is beamformed based on a channel estimate of an SRS transmitted from the UE, or a previous CSI feedback transmitted from the UE based on a previous CSI-RS, or both. The operations of 1305 may be performed in accordance with examples as disclosed herein. In some examples, aspects of the operations of 1305 may be performed by a beamformed CSI-RS reception component 725 as described with reference to FIG. 7.

At 1310, the method may include transmitting a feedback message including compressed CSI that is generated based on encoding a measurement of the CSI-RS. The operations of 1310 may be performed in accordance with examples as disclosed herein. In some examples, aspects of the operations of 1310 may be performed by a compressed CSI feedback component 730 as described with reference to FIG. 7.

Figure 14:
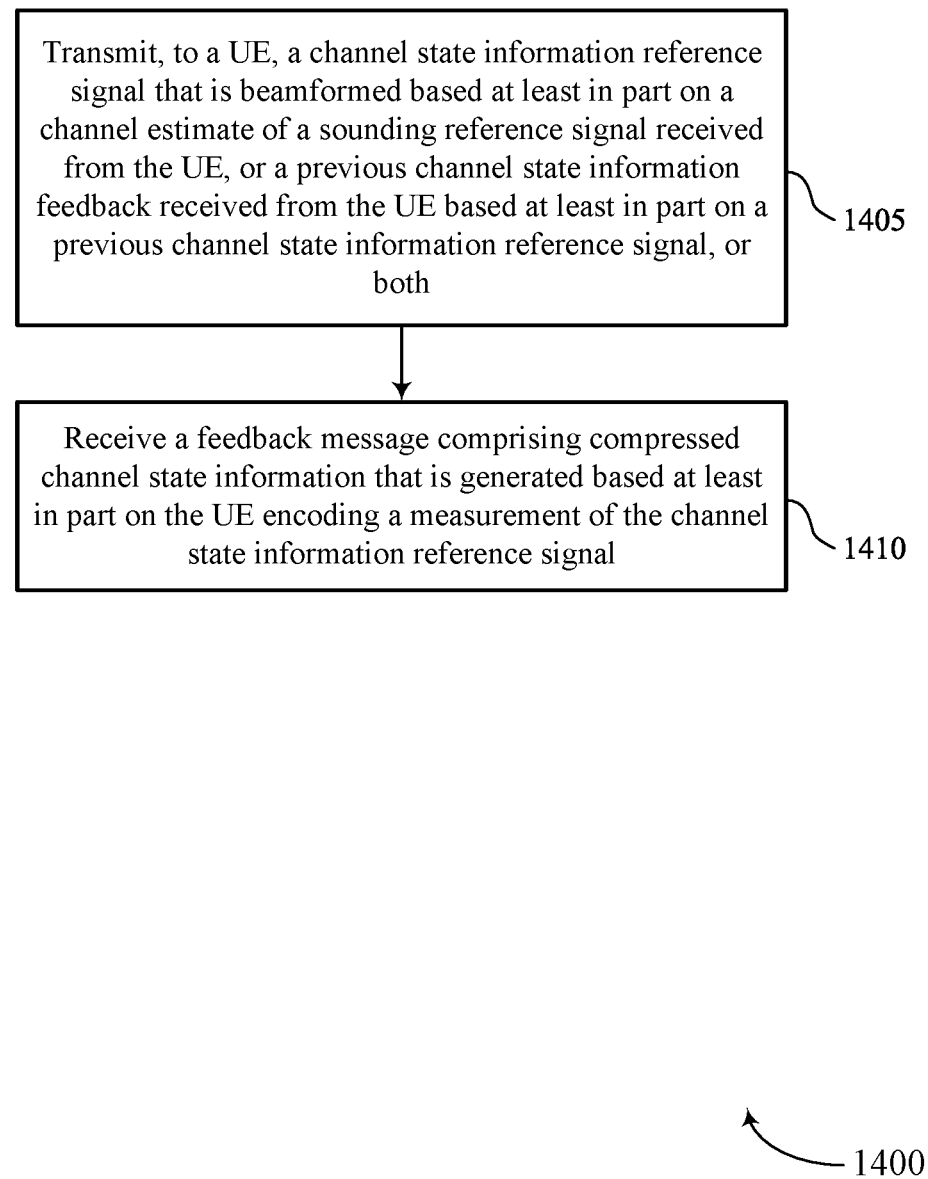

FIG. 14 shows a flowchart illustrating a method 1400 that supports CLICT and enhancement with distributed source coding in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a CSI-RS that is beamformed based on a channel estimate of an SRS received from the UE, or a previous CSI feedback received from the UE based on a previous CSI-RS, or both. The operations of 1405 may be performed in accordance with examples as disclosed herein. In some examples, aspects of the operations of 1405 may be performed by a beamformed CSI-RS component 1125 as described with reference to FIG. 11.

At 1410, the method may include receiving a feedback message including compressed CSI that is generated based on the UE encoding a measurement of the CSI-RS. The operations of 1410 may be performed in accordance with examples as disclosed herein. In some examples, aspects of the operations of 1410 may be performed by a compressed CSI feedback reception component 1130 as described with reference to FIG. 11.

Figure 15:
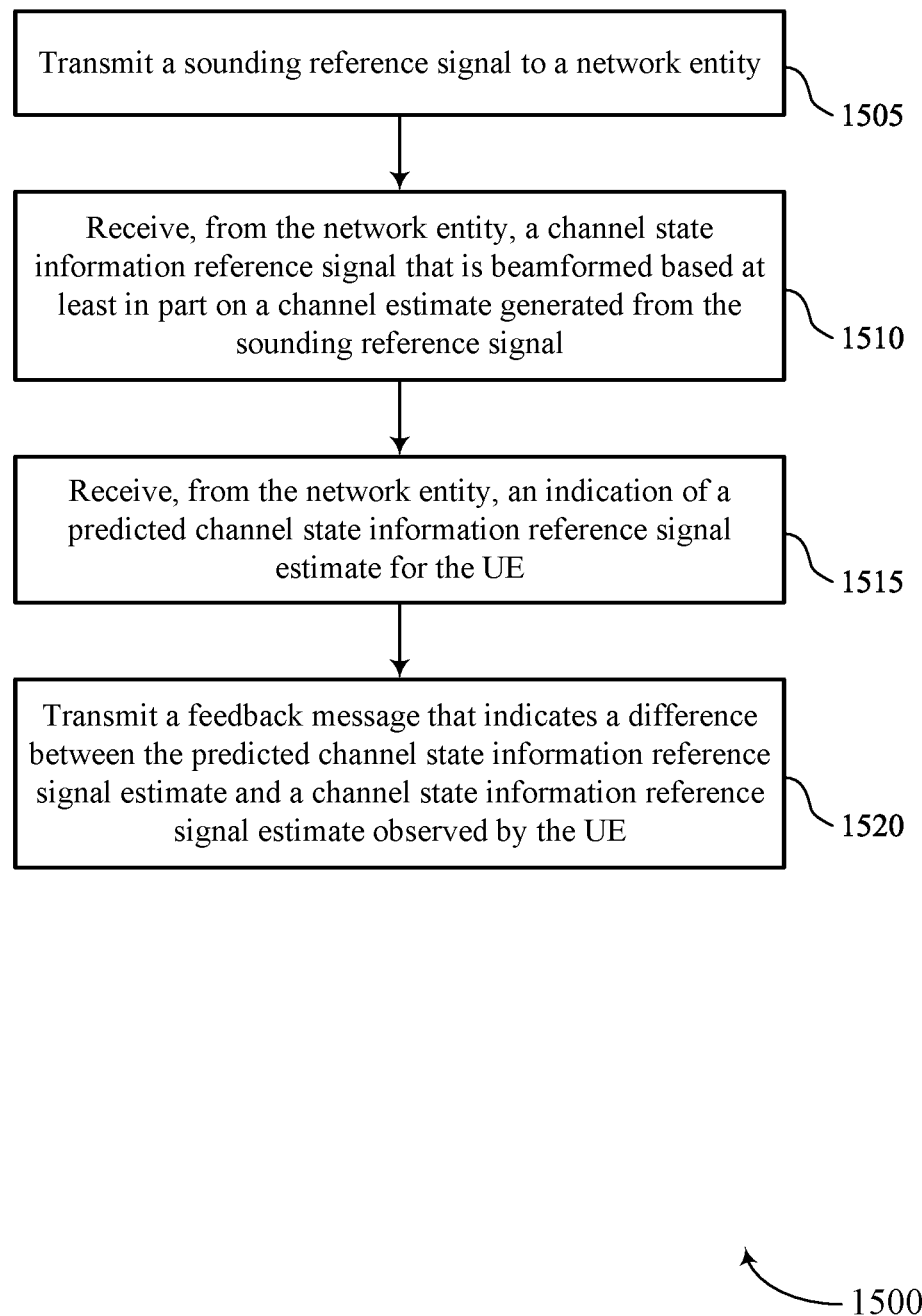

FIG. 15 shows a flowchart illustrating a method 1500 that supports CLICT and enhancement with distributed source coding in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting an SRS to a network entity. The operations of 1505 may be performed in accordance with examples as disclosed herein. In some examples, aspects of the operations of 1505 may be performed by an SRS transmission component 735 as described with reference to FIG. 7.

At 1510, the method may include receiving, from the network entity, a CSI-RS that is beamformed based on a channel estimate generated from the SRS. The operations of 1510 may be performed in accordance with examples as disclosed herein. In some examples, aspects of the operations of 1510 may be performed by a beamformed CSI-RS reception component 725 as described with reference to FIG. 7.

At 1515, the method may include receiving, from the network entity, an indication of a predicted CSI-RS estimate for the UE. The operations of 1515 may be performed in accordance with examples as disclosed herein. In some examples, aspects of the operations of 1515 may be performed by a CSI-RS estimate prediction component 740 as described with reference to FIG. 7.

At 1520, the method may include transmitting a feedback message that indicates a difference between the predicted CSI-RS estimate and a CSI-RS estimate observed by the UE. The operations of 1520 may be performed in accordance with examples as disclosed herein. In some examples, aspects of the operations of 1520 may be performed by an estimate difference indication component 745 as described with reference to FIG. 7.

Figure 16:
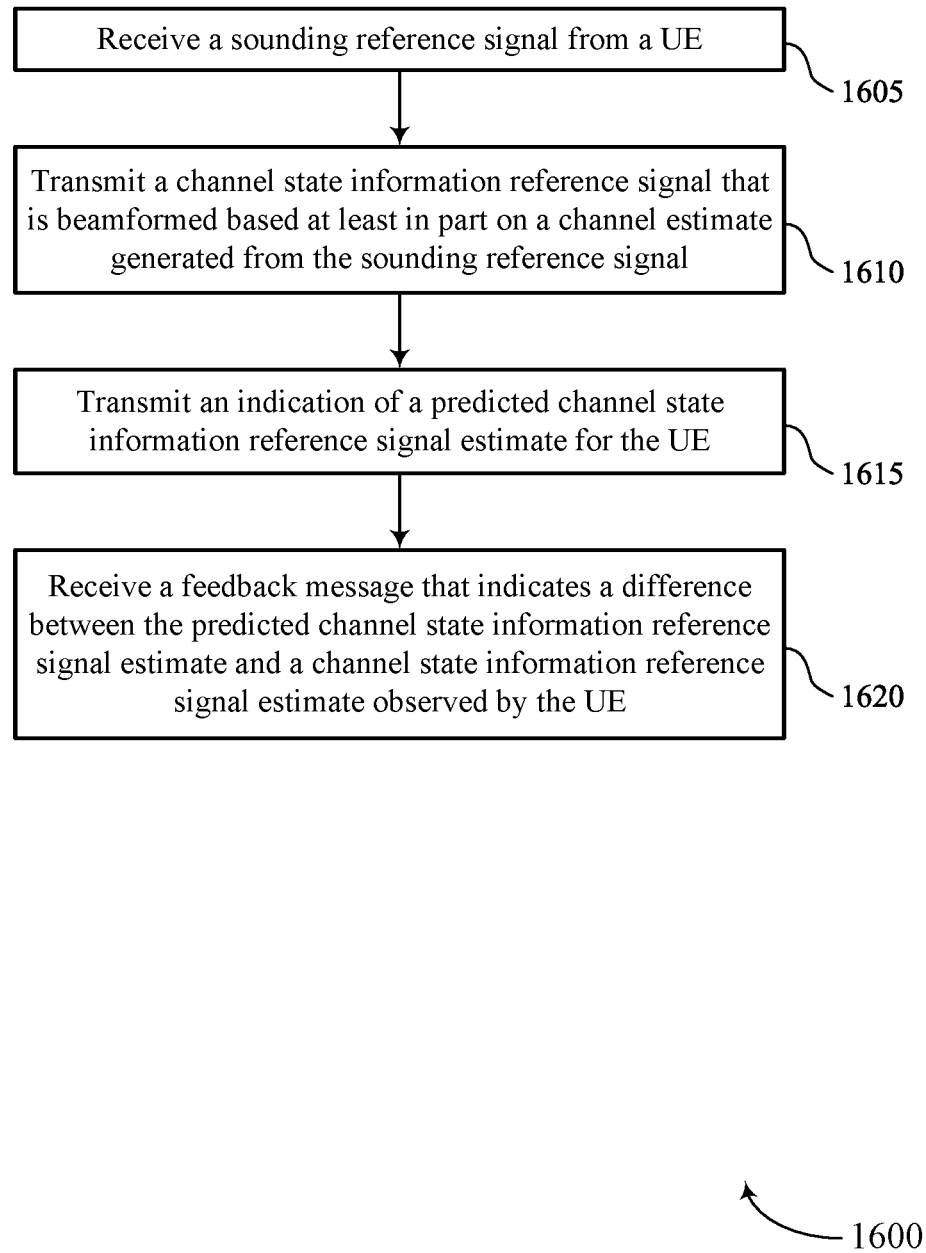

FIG. 16 shows a flowchart illustrating a method 1600 that supports CLICT and enhancement with distributed source coding in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving an SRS from a UE. The operations of 1605 may be performed in accordance with examples as disclosed herein. In some examples, aspects of the operations of 1605 may be performed by an SRS reception component 1135 as described with reference to FIG. 11.

At 1610, the method may include transmitting a CSI-RS that is beamformed based on a channel estimate generated from the SRS. The operations of 1610 may be performed in accordance with examples as disclosed herein. In some examples, aspects of the operations of 1610 may be performed by a beamformed CSI-RS component 1125 as described with reference to FIG. 11.

At 1615, the method may include transmitting an indication of a predicted CSI-RS estimate for the UE. The operations of 1615 may be performed in accordance with examples as disclosed herein. In some examples, aspects of the operations of 1615 may be performed by a CSI-RS estimate prediction component 1140 as described with reference to FIG. 11.

At 1620, the method may include receiving a feedback message that indicates a difference between the predicted CSI-RS estimate and a CSI-RS estimate observed by the UE. The operations of 1620 may be performed in accordance with examples as disclosed herein. In some examples, aspects of the operations of 1620 may be performed by a compressed CSI feedback reception component 1130 as described with reference to FIG. 11.

Aspect 1: A method for wireless communication at a UE, comprising: receiving, from a network entity, a channel state information reference signal that is beamformed based at least in part on a channel estimate of a sounding reference signal transmitted from the UE, or a previous channel state information feedback transmitted from the UE based at least in part on a previous channel state information reference signal, or both; and transmitting a feedback message comprising compressed channel state information that is generated based at least in part on encoding a measurement of the channel state information reference signal.

Aspect 2: The method of aspect 1, wherein transmitting the feedback message comprises: transmitting the feedback message comprising the compressed channel state information, wherein a granularity or amount of feedback in the compressed channel state information is based at least in part on a statistical dependency between a predicted channel state information reference signal estimate at the network entity and the measurement of the channel state information reference signal.

Aspect 3: The method of aspect 2, further comprising: receiving, form the network entity, an indication of the granularity, amount, or both, of the feedback in the compressed channel state information, wherein a channel state information compression rate is based at least in part on a correlation of the channel state information of the sounding reference signal, a quality of the channel state information reference signal, a capacity of a feedback channel containing the feedback message, or a combination thereof.

Aspect 4: The method of any of aspects 1 through 3, further comprising: receiving downlink data that is beamformed based at least in part on channel state information generated from the channel estimate of the sounding reference signal and the compressed channel state information, wherein the downlink data is assumed to be quasi-collocated with the feedback message.

Aspect 5: The method of any of aspects 1 through 4, further comprising: transmitting a message indicating a capability to encode a channel state information reference signal measurement.

Aspect 6: The method of any of aspects 1 through 5, wherein transmitting the feedback message further comprises: transmitting the feedback message in a different frequency band than the channel state information reference signal is received.

Aspect 7: The method of any of aspects 1 through 6, further comprising: receiving a grant scheduling downlink data, wherein a downlink control channel carrying the grant is quasi-collocated with the previous channel state information reference signal, a predicted channel state information reference signal estimate, or both; and monitoring for the downlink data that is beamformed based at least in part on channel state information generated from the channel estimate of the sounding reference signal and the compressed channel state information.

Aspect 8: The method of any of aspects 1 through 7, wherein encoding the measurement of the channel state information reference signal comprises: applying an encoding scheme to the measurement of the channel state information reference signal to generate the compressed channel state information based at least in part on an assumed predicted channel state information reference signal estimate at the network entity.

Aspect 9: The method of aspect 8, wherein the encoding scheme is a syndrome-based encoding scheme.

Aspect 10: The method of any of aspects 1 through 9, further comprising: receiving control signaling indicating an encoding scheme for encoding the measurement of the channel state information reference signal with a corresponding compression granularity, a corresponding data rate, or both, for the feedback message.

Aspect 11: The method of any of aspects 1 through 10, wherein the compressed channel state information and the channel estimate of the sounding reference signal each include different portions of information associated with an estimated channel observed at the UE.

Aspect 12: A method for wireless communication at a network entity, comprising: transmitting, to a UE, a channel state information reference signal that is beamformed based at least in part on a channel estimate of a sounding reference signal received from the UE, or a previous channel state information feedback received from the UE based at least in part on a previous channel state information reference signal, or both; and receiving a feedback message comprising compressed channel state information that is generated based at least in part on the UE encoding a measurement of the channel state information reference signal.

Aspect 13: The method of aspect 12, wherein receiving the feedback message comprises: receiving the feedback message comprising the compressed channel state information, wherein a granularity or amount of feedback in the compressed channel state information is based at least in part on a statistical dependency between a predicted channel state information reference signal estimate at the network entity and the measurement of the channel state information reference signal.

Aspect 14: The method of any of aspects 12 through 13, further comprising: transmitting downlink data that is beamformed based at least in part on channel state information generated from the channel estimate of the sounding reference signal and the compressed channel state information.

Aspect 15: The method of aspect 14, further comprising: transmitting a grant scheduling downlink data, including the downlink data that is beamformed based at least in part on channel state information generated from the channel estimate of the sounding reference signal and the compressed channel state information.

Aspect 16: The method of any of aspects 12 through 15, further comprising: receiving a message indicating a capability to encode a channel state information reference signal measurement; and determining a feedback mode of operation for the UE based at least in part on the message.

Aspect 17: The method of any of aspects 12 through 16, wherein receiving the feedback message further comprises: receiving the feedback message in a different frequency band than the channel state information reference signal is transmitted.

Aspect 18: The method of any of aspects 12 through 17, wherein receiving the feedback message comprising compressed channel state information comprises: decoding the compressed channel state information based at least in part on a decoding scheme to decode the measurement of the channel state information reference signal.

Aspect 19: A method for wireless communication at a UE, comprising: transmitting a sounding reference signal to a network entity; receiving, from the network entity, a channel state information reference signal that is beamformed based at least in part on a channel estimate generated from the sounding reference signal; receiving, from the network entity, an indication of a predicted channel state information reference signal estimate for the UE; and transmitting a feedback message that indicates a difference between the predicted channel state information reference signal estimate and a channel state information reference signal estimate observed by the UE.

Aspect 20: The method of aspect 19, wherein receiving the indication of the predicted channel state information reference signal estimate comprises: receiving the indication of the predicted channel state information reference signal estimate via an RRC, a downlink control information, or both.

Aspect 21: The method of any of aspects 19 through 20, wherein receiving the indication of the predicted channel state information reference signal estimate comprises: receiving the indication of the predicted channel state information reference signal estimate, a portion of the channel state information reference signal estimate, or both, via a wideband, one or more sub-bands, or both.

Aspect 22: The method of any of aspects 19 through 21, wherein the difference between the predicted channel state information reference signal estimate and the channel state information reference signal estimate observed by the UE is indicated in accordance with a non-uniform codebook centered around the predicted channel state information reference signal estimate, the non-uniform codebook associated with a codebook granularity, a feedback data rate, or both.

Aspect 23: The method of aspect 22, wherein the codebook granularity, the feedback data rate, or both are based at least in part on a statistical dependency of the channel state information reference signal estimate, the channel estimate generated from the sounding reference signal, a previous channel state information feedback transmitted from the UE based at least in part on a previous channel state information reference signal, or a combination thereof.

Aspect 24: The method of any of aspects 19 through 23, further comprising: receiving downlink data that is beamformed based at least in part on channel state information generated from the channel estimate of the sounding reference signal, a previous channel state information feedback transmitted from the UE based at least in part on a previous channel state information reference signal, or both, and the difference between the predicted channel state information reference signal estimate and the channel state information reference signal estimate observed by the UE, wherein the downlink data is quasi-collocated with the previous channel state information reference signal, the predicted channel state information reference signal estimate, or both.

Aspect 25: The method of any of aspects 19 through 24, wherein transmitting the feedback message further comprises: transmitting the feedback message in a different frequency band than the channel state information reference signal is received.

Aspect 26: The method of any of aspects 19 through 25, further comprising: receiving a grant scheduling downlink data; and monitoring for the downlink data that is beamformed based at least in part on channel state information generated from the channel estimate of the sounding reference signal and the difference between the predicted channel state information reference signal estimate and the channel state information reference signal estimate observed by the UE.

Aspect 27: The method of any of aspects 19 through 26, wherein the indication of the predicted channel state information reference signal estimate is based at least in part on the channel estimate of the sounding reference signal, a previous channel state information feedback transmitted from the UE based at least in part on a previous channel state information reference signal, or both.

Aspect 28: A method for wireless communication at a network entity comprising: receiving a sounding reference signal from a UE; transmitting a channel state information reference signal that is beamformed based at least in part on a channel estimate generated from the sounding reference signal; transmitting an indication of a predicted channel state information reference signal estimate for the UE; and receiving a feedback message that indicates a difference between the predicted channel state information reference signal estimate and a channel state information reference signal estimate observed by the UE.

Aspect 29: The method of aspect 28, further comprising: transmitting downlink data that is beamformed based at least in part on channel state information generated from the channel estimate of the sounding reference signal, a previous channel state information feedback transmitted from the UE based at least in part on a previous channel state information reference signal, or both, and the difference between the predicted channel state information reference signal estimate and the channel state information reference signal estimate observed by the UE, wherein the downlink data is quasi-collocated with the previous channel state information reference signal, the predicted channel state information reference signal estimate, or both.

Aspect 30: The method of any of aspects 28 through 29, wherein receiving the feedback message further comprises: receiving the feedback message in a different frequency band than the channel state information reference signal is transmitted.

Aspect 31: An apparatus for wireless communication at a UE, comprising a processor; memory coupled with the processor; and instructions stored in the memory and executable by the processor to cause the apparatus to perform a method of any of aspects 1 through 11.

Aspect 32: An apparatus for wireless communication at a UE, comprising at least one means for performing a method of any of aspects 1 through 11.

Aspect 33: A non-transitory computer-readable medium storing code for wireless communication at a UE, the code comprising instructions executable by a processor to perform a method of any of aspects 1 through 11.

Aspect 34: An apparatus for wireless communication at a network entity, comprising a processor; memory coupled with the processor; and instructions stored in the memory and executable by the processor to cause the apparatus to perform a method of any of aspects 12 through 18.

Aspect 35: An apparatus for wireless communication at a network entity, comprising at least one means for performing a method of any of aspects 12 through 18.

Aspect 36: A non-transitory computer-readable medium storing code for wireless communication at a network entity, the code comprising instructions executable by a processor to perform a method of any of aspects 12 through 18.

Aspect 37: An apparatus for wireless communication at a UE, comprising a processor; memory coupled with the processor; and instructions stored in the memory and executable by the processor to cause the apparatus to perform a method of any of aspects 19 through 27.

Aspect 38: An apparatus for wireless communication at a UE, comprising at least one means for performing a method of any of aspects 19 through 27.

Aspect 39: A non-transitory computer-readable medium storing code for wireless communication at a UE, the code comprising instructions executable by a processor to perform a method of any of aspects 19 through 27.

Aspect 40: An apparatus comprising a processor; memory coupled with the processor; and instructions stored in the memory and executable by the processor to cause the apparatus to perform a method of any of aspects 28 through 30.

Aspect 41: An apparatus comprising at least one means for performing a method of any of aspects 28 through 30.

Aspect 42: A non-transitory computer-readable medium storing code the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network entity, a channel state information reference signal that is beamformed based at least in part on a channel estimate of a sounding reference signal transmitted from the UE, or a previous channel state information feedback transmitted from the UE based at least in part on a previous channel state information reference signal, or both;
   transmitting a feedback message comprising compressed channel state information that is generated based at least in part on encoding a measurement of the channel state information reference signal; and
   receiving downlink data that is beamformed based at least in part on channel state information generated from the channel estimate of the sounding reference signal and the compressed channel state information, wherein the downlink data is assumed to be quasi-collocated with the feedback message.

2. The method of claim 1, wherein transmitting the feedback message comprises:
   transmitting the feedback message comprising the compressed channel state information, wherein a granularity or amount of feedback in the compressed channel state information is based at least in part on a statistical dependency between a predicted channel state information reference signal estimate at the network entity and the measurement of the channel state information reference signal.

3. The method of claim 1, further comprising:
   transmitting a message indicating a capability to encode a channel state information reference signal measurement.

4. The method of claim 1, wherein transmitting the feedback message further comprises:
   transmitting the feedback message in a different frequency band than the channel state information reference signal is received.

5. The method of claim 1, further comprising:
   receiving a grant scheduling the downlink data, wherein a downlink control channel carrying the grant is quasi-collocated with the previous channel state information reference signal, a predicted channel state information reference signal estimate, or both; and
   monitoring for the downlink data that is beamformed based at least in part on channel state information generated from the channel estimate of the sounding reference signal and the compressed channel state information.

6. The method of claim 1, wherein encoding the measurement of the channel state information reference signal comprises:
applying an encoding scheme to the measurement of the channel state information reference signal to generate the compressed channel state information based at least in part on an assumed predicted channel state information reference signal estimate at the network entity.

7. The method of claim 6, wherein the encoding scheme is a syndrome-based encoding scheme.

8. The method of claim 1, further comprising:
receiving control signaling indicating an encoding scheme for encoding the measurement of the channel state information reference signal with a corresponding compression granularity, a corresponding data rate, or both, for the feedback message.

9. The method of claim 1, wherein the compressed channel state information and the channel estimate of the sounding reference signal each include different portions of information associated with an estimated channel observed at the UE.

10. The method of claim 1, further comprising:
receiving, from the network entity, an indication of a granularity or an amount of syndrome bits, or both, of feedback in the compressed channel state information, wherein a channel state information compression rate is based at least in part on a correlation between network-side channel estimation information and the channel state information of the sounding reference signal, a quality of the channel state information reference signal, a capacity of a feedback channel used to transmit the feedback message, or any combination thereof.

11. A method for wireless communication at a network entity, comprising:
transmitting, to a user equipment (UE), a channel state information reference signal that is beamformed based at least in part on a channel estimate of a sounding reference signal received from the UE, or a previous channel state information feedback received from the UE based at least in part on a previous channel state information reference signal, or both;
receiving a feedback message comprising compressed channel state information that is generated based at least in part on the UE encoding a measurement of the channel state information reference signal; and
transmitting downlink data that is beamformed based at least in part on channel state information generated from the channel estimate of the sounding reference signal and the compressed channel state information.

12. The method of claim 11, wherein receiving the feedback message comprises:
receiving the feedback message comprising the compressed channel state information, wherein a granularity or amount of feedback in the compressed channel state information is based at least in part on a statistical dependency between a predicted channel state information reference signal estimate at the network entity and the measurement of the channel state information reference signal.

13. The method of claim 11, further comprising:
transmitting a grant scheduling the downlink data, including the downlink data that is beamformed based at least in part on channel state information generated from the channel estimate of the sounding reference signal and the compressed channel state information.

14. The method of claim 11, further comprising:
receiving a message indicating a capability to encode a channel state information reference signal measurement; and
determining a feedback mode of operation for the UE based at least in part on the message.

15. The method of claim 11, wherein receiving the feedback message further comprises:
receiving the feedback message in a different frequency band than the channel state information reference signal is transmitted.

16. The method of claim 11, wherein receiving the feedback message comprising compressed channel state information comprises:
decoding the compressed channel state information based at least in part on a decoding scheme to decode the measurement of the channel state information reference signal.

17. A method for wireless communication at a user equipment (UE), comprising:
transmitting a sounding reference signal to a network entity;
receiving, from the network entity, a channel state information reference signal that is beamformed based at least in part on a channel estimate generated from the sounding reference signal;
receiving, via a wideband or one or more sub-bands, or both, an indication of at least a portion of a predicted channel state information reference signal estimate for the UE; and
transmitting a feedback message that indicates a difference between the predicted channel state information reference signal estimate and a channel state information reference signal estimate observed by the UE.

18. The method of claim 17, wherein receiving the indication of the predicted channel state information reference signal estimate comprises:
receiving the indication of the predicted channel state information reference signal estimate via a radio resource control (RRC), a downlink control information, or both.

19. The method of claim 17, wherein the difference between the predicted channel state information reference signal estimate and the channel state information reference signal estimate observed by the UE is indicated in accordance with a non-uniform codebook centered around the predicted channel state information reference signal estimate, the non-uniform codebook associated with a codebook granularity, a feedback data rate, or both.

20. The method of claim 19, wherein the codebook granularity, the feedback data rate, or both are based at least in part on a statistical dependency of the channel state information reference signal estimate, the channel estimate generated from the sounding reference signal, a previous channel state information feedback transmitted from the UE based at least in part on a previous channel state information reference signal, or a combination thereof.

21. The method of claim 17, further comprising:
receiving downlink data that is beamformed based at least in part on channel state information generated from the channel estimate of the sounding reference signal, a previous channel state information feedback transmitted from the UE based at least in part on a previous channel state information reference signal, or both, and the difference between the predicted channel state information reference signal estimate and the channel state information reference signal estimate observed by the UE, wherein the downlink data is quasi-collocated with the previous channel state information reference signal, the predicted channel state information reference signal estimate, or both.

22. The method of claim 17, wherein transmitting the feedback message further comprises:
transmitting the feedback message in a different frequency band than the channel state information reference signal is received.

23. The method of claim 17, further comprising:
receiving a grant scheduling downlink data; and
monitoring for the downlink data that is beamformed based at least in part on channel state information generated from the channel estimate of the sounding reference signal and the difference between the predicted channel state information reference signal estimate and the channel state information reference signal estimate observed by the UE.

24. The method of claim 17, wherein the indication of the predicted channel state information reference signal estimate is based at least in part on the channel estimate of the sounding reference signal, a previous channel state information feedback transmitted from the UE based at least in part on a previous channel state information reference signal, or both.

25. A method for wireless communication at a network entity comprising:
receiving a sounding reference signal from a user equipment (UE);
transmitting, via a first frequency band, a channel state information reference signal that is beamformed based at least in part on a channel estimate generated from the sounding reference signal;
transmitting an indication of a predicted channel state information reference signal estimate for the UE; and
receiving, via a second frequency band that is different from the first frequency band, a feedback message that indicates a difference between the predicted channel state information reference signal estimate and a channel state information reference signal estimate observed by the UE.

26. The method of claim 25, further comprising:
transmitting downlink data that is beamformed based at least in part on channel state information generated from the channel estimate of the sounding reference signal, a previous channel state information feedback transmitted from the UE based at least in part on a previous channel state information reference signal, or both, and the difference between the predicted channel state information reference signal estimate and the channel state information reference signal estimate observed by the UE, wherein the downlink data is quasi-collocated with the previous channel state information reference signal, the predicted channel state information reference signal estimate, or both.

* * * * *